United States Patent
Takamura et al.

(10) Patent No.: US 10,619,564 B2
(45) Date of Patent: Apr. 14, 2020

(54) GAS TURBINE AND COMPONENT-TEMPERATURE ADJUSTMENT METHOD THEREFOR

(71) Applicant: Mitsubishi Hitachi Power Systems, Ltd., Kanagawa (JP)

(72) Inventors: Keita Takamura, Yokohama (JP); Kazumasa Takata, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 199 days.

(21) Appl. No.: 15/778,122

(22) PCT Filed: Nov. 25, 2016

(86) PCT No.: PCT/JP2016/084916
§ 371 (c)(1),
(2) Date: May 22, 2018

(87) PCT Pub. No.: WO2017/090709
PCT Pub. Date: Jun. 1, 2017

(65) Prior Publication Data
US 2018/0340468 A1 Nov. 29, 2018

(30) Foreign Application Priority Data
Nov. 26, 2015 (JP) ................. 2015-231053

(51) Int. Cl.
*F02C 6/08* (2006.01)
*F01D 11/24* (2006.01)
(Continued)

(52) U.S. Cl.
CPC ............... *F02C 6/08* (2013.01); *F01D 5/087* (2013.01); *F01D 11/24* (2013.01); *F01D 25/14* (2013.01);
(Continued)

(58) Field of Classification Search
CPC .... F02C 6/08; F02C 9/18; F01D 5/087; F01D 11/24; F01D 25/24; F05D 2260/20; F05D 2260/205; F05D 2220/3218
See application file for complete search history.

(56) References Cited

U.S. PATENT DOCUMENTS

| | | | | |
|---|---|---|---|---|
| 5,611,197 A | * | 3/1997 | Bunker | .................... F02C 7/185 |
| | | | | 415/115 |
| 5,782,076 A | * | 7/1998 | Huber | ....................... F02C 7/08 |
| | | | | 415/115 |

(Continued)

FOREIGN PATENT DOCUMENTS

| JP | 11-22413 | 1/1999 |
|---|---|---|
| JP | 2002-213207 | 7/2002 |

(Continued)

OTHER PUBLICATIONS

International Search Report dated Feb. 21, 2017 in International (PCT) Application No. PCT/JP2016/084916, with English translation.

(Continued)

*Primary Examiner* — Carlos A Rivera
(74) *Attorney, Agent, or Firm* — Wenderoth, Lind & Ponack, L.L.P.

(57) ABSTRACT

A gas turbine includes a compressor, a turbine, an extraction line, and a component introduction line. A compressed air from an intermediate compression stage of the compressor, as an extraction air, is extracted through the extraction line and is introduced to a first component configuring a portion of the turbine casing through the extraction line. The extraction air, which has passed through the first component, is introduced to a second component serving as a component configuring the turbine through the component introduction line. The second component is a low-pressure component, (Continued)

which is disposed under a pressure environment lower than a pressure of the compressed air at an outlet of the intermediate compression stage.

15 Claims, 15 Drawing Sheets

(51) Int. Cl.
*F01D 25/14* (2006.01)
*F02C 7/18* (2006.01)
*F01D 5/08* (2006.01)
*F02C 7/28* (2006.01)
*F02C 9/18* (2006.01)
*F01D 9/06* (2006.01)

(52) U.S. Cl.
CPC .............. *F02C 7/18* (2013.01); *F02C 7/185* (2013.01); *F02C 7/28* (2013.01); *F02C 9/18* (2013.01); *F01D 9/065* (2013.01); *F05D 2220/3218* (2013.01); *F05D 2240/11* (2013.01); *F05D 2260/20* (2013.01); *F05D 2260/205* (2013.01)

(56) References Cited

U.S. PATENT DOCUMENTS

| | | | | |
|---|---|---|---|---|
| 6,065,282 | A * | 5/2000 | Fukue | F02C 7/185 |
| | | | | 415/115 |
| 6,217,279 | B1 | 4/2001 | Ai et al. | |
| 6,253,554 | B1 * | 7/2001 | Kobayashi | F02C 7/12 |
| | | | | 60/736 |
| 6,487,863 | B1 | 12/2002 | Chen et al. | |
| 6,532,744 | B1 * | 3/2003 | Reiter | F02C 7/18 |
| | | | | 415/115 |
| 2002/0094268 | A1 | 7/2002 | Sugishita et al. | |
| 2010/0175387 | A1 * | 7/2010 | Foust | F02C 7/185 |
| | | | | 60/782 |
| 2011/0027068 | A1 | 2/2011 | Floyd, II et al. | |
| 2011/0135456 | A1 * | 6/2011 | Takahashi | F01D 11/24 |
| | | | | 415/180 |
| 2011/0138818 | A1 * | 6/2011 | Mizukami | F01D 11/24 |
| | | | | 60/778 |
| 2013/0036747 | A1 * | 2/2013 | Fuchs | F02C 7/185 |
| | | | | 60/782 |
| 2013/0111919 | A1 * | 5/2013 | Chehab | F01D 11/24 |
| | | | | 60/778 |
| 2013/0199153 | A1 * | 8/2013 | Reed | F02C 9/18 |
| | | | | 60/204 |
| 2013/0294883 | A1 | 11/2013 | Ballard, Jr. et al. | |
| 2014/0023493 | A1 | 1/2014 | Kitagawa et al. | |
| 2014/0157791 | A1 * | 6/2014 | Saha | F01D 17/141 |
| | | | | 60/785 |
| 2014/0230441 | A1 | 8/2014 | Mayer et al. | |
| 2014/0271111 | A1 | 9/2014 | Ballard, Jr. et al. | |
| 2016/0230663 | A1 | 8/2016 | Mizukami et al. | |
| 2017/0016397 | A1 * | 1/2017 | Kim | F01D 5/085 |

FOREIGN PATENT DOCUMENTS

| | | |
|---|---|---|
| JP | 2009-191655 | 8/2009 |
| JP | 2011-27109 | 2/2011 |
| JP | 2012-72708 | 4/2012 |
| JP | 2012-159056 | 8/2012 |
| JP | 2012-207565 | 10/2012 |
| JP | 2013-204545 | 10/2013 |
| JP | 2013-231439 | 11/2013 |
| JP | 2014-181702 | 9/2014 |
| WO | 2010/084573 | 7/2010 |
| WO | 2012/001852 | 1/2012 |
| WO | 2015/041346 | 3/2015 |

OTHER PUBLICATIONS

Written Opinion of the International Searching Authority dated Feb. 21, 2017 in International (PCT) Application No. PCT/JP2016/084916, with English translation.

* cited by examiner

GAS TURBINE AND COMPONENT-TEMPERATURE ADJUSTMENT METHOD THEREFOR

TECHNICAL FIELD

The present invention relates to a gas turbine and a component-temperature adjustment method therefor.

Priority is claimed on Japanese Patent Application No. 2015-231053, filed on Nov. 26, 2015, the content of which is incorporated herein by reference.

BACKGROUND ART

A gas turbine includes a compressor which compresses air, a combustion which combusts a fuel in the air compressed by the compressor, and a turbine which is driven by a combustion gas from the combustor. The turbine includes a turbine rotor which rotates about an axis, a turbine casing which covers the turbine rotor, and a plurality of vane rows which are fixed to an inner peripheral side of the turbine casing. The turbine rotor includes a rotor shaft which extends in an axial direction about the axis and a plurality of blade rows which are fixed to an outer periphery of the rotor shaft and are arranged in the axial direction. The vane row is disposed on an axially upstream side of each blade row. Each vane row includes a plurality of vanes which are arranged in a circumferential direction about the axis. In addition, each blade row includes a plurality of blades which are arranged in the circumferential direction about the axis.

In general, a gap between an inner peripheral surface of the turbine casing and a tip of the blade is referred to as a tip clearance. The turbine efficiency increases as the tip clearance decreases.

For example, as a method of adjusting the tip clearance, there is a method disclosed in the following Patent Document 1. In this method, during a steady state operation of a gas turbine, air is supplied to a plurality of vane rings configuring a portion of the turbine casing and the plurality of vane rings are cooled by the air. In this method, a portion of a compressed air, which is discharged from a discharge port of a compressor and introduced to a combustor, is extracted. In addition, the extracted compressed air is cooled by a cooler, and thereafter, is boosted by a booster. The compressed air from the booster flows into the vane ring of an axially upstream side among the plurality of vane rings, and sequentially flows into the vane ring of an axially downstream side. The compressed air flow out from the vane ring of the axially downstream side is supplied to the combustor to cool the combustor. The compressed air which has cooled the combustor is discharged to the outside of the combustor.

CITATION LIST

Patent Document

Patent Document 1: PCT international Publication No. WO2015/041346

SUMMARY OF INVENTION

Technical Problem

In the method disclosed in Patent Document 1, the compressed air of which a pressure and a temperature are increased by the compressor is cooled by the cooler, and the compressed air is boosted by the booster. Accordingly, in the method disclosed in Patent Document 1, there is a problem that an equipment cost increases. In addition, in the method disclosed in Patent Document 1, a portion of the compressed air for combustion having a high temperature and a high pressure discharged from the discharge port of the compressor is used as cooling air. Accordingly, since the compressed air for combustion having a high temperature and a high pressure is cooled, and there is a problem that compressed air having a high temperature and a high pressure cannot be effectively used.

Therefore, an object of the present invention is to provide a gas turbine capable of effectively using compressed air having a high temperature and a high pressure while limiting equipment cost and a component-temperature adjustment method therefor.

Solution to Problem

In order to achieve the above-described object, according to a first aspect of the present invention, there is provided a gas turbine including: a compressor which includes a plurality of compression stages and is configured to sequentially compress air at each of the compression stages; a combustor which is configured to combust a fuel in air compressed by the compressor to generate a combustion gas; a turbine which includes a turbine rotor which is rotated about an axis by the combustion gas, a tubular turbine casing which covers the turbine rotor, and a plurality of vane rows which are fixed to an inner peripheral side of the turbine casing; an extraction line through which the compressed air from an intermediate compression stage among the plurality of compression stages is extracted as an extraction air and the extraction air is introduced to a first component configuring a portion of the turbine casing; and a component introduction line through which the extraction air which has passed through the first component is introduced to a second component, which is different from the first component, among components configuring the turbine. A first air flow path which extends in an axial direction in which the axis extends and through which the extraction air from the extraction line flows is formed in the first component. The second component is a low-pressure component which is disposed under a pressure environment lower than a pressure of the compressed air at an outlet of the intermediate compression stage. A second air flow path through which the extraction air from the component introduction line flows is formed in the low-pressure component.

A clearance is required between an inner peripheral surface of the turbine casing and a radially outer end of the turbine rotor. In general, this clearance is referred to as a tip clearance. In a case where a change of the tip clearance is large, it is necessary to increase the steady clearance. In addition, the steady clearance is the tip clearance when a stable operation of the gas turbine is continuing. If the steady clearance is large, at the time of a steady state operation of the gas turbine, the flow rate of the combustion gas passing through a portion between the radially outer end of the turbine rotor and the inner peripheral surface of the turbine casing increases. Accordingly, if the steady clearance is large, gas turbine performance decreases at the time of the steady state operation of the gas turbine. Therefore, in order to increase the gas turbine performance, it is necessary to decrease the steady clearance.

In the gas turbine, while the combustion gas flows through the combustion gas flow path in the turbine casing, the extraction air is introduced to the first component via the extraction line, and thus, the first component can be cooled. Accordingly, even when the combustion gas flows through the combustion gas flow path, in the present embodiment, it is possible to prevent the inner diameter of the turbine casing from increasing due to the thermal expansion. Therefore, it is possible to suppress the change of the inner diameter of the turbine casing in a state where the combustion gas flows through the combustion gas flow path and a state where the combustion gas does not flow to the combustion gas flow path. Accordingly, in the gas turbine, it is possible to suppress the change of the tip clearance, and as a result, it is possible to decrease the steady clearance.

In the gas turbine, the compressed air having a high temperature and a high pressure discharged from the compressor via the final compression stage of the compressor does not flow to the first component, and the compressed air from the intermediate compression stage of the compressor flows to the first component, as the extraction air. Therefore, in the gas turbine, the compressed air from the intermediate compression stage of the compressor can be used as it is for cooling the first component without being cooled by a cooler.

Moreover, in the gas turbine, the second component is the low-pressure component disposed under a pressure environment lower than the pressure of the compressed air at the outlet of the intermediate compression stage. Therefore, in the gas turbine, even when the compressed air from the compressor is not boosted by a booster, the extraction air which has passed through the first component flows to the low-pressure component, and thus, it is possible to cool the low-pressure component.

Accordingly, in the gas turbine, the first component configuring a portion of the turbine casing is cooled to decrease the steady clearance, the low-pressure component which is the second component different from the first component is cooled, and thus, it is possible to decrease equipment cost. Moreover, in the gas turbine, the first component and the low-pressure component are cooled by the compressed air from the intermediate compression stage of the compressor, and thus, for example, the compressed air having a high temperature and a high pressure discharged from the compressor via the final compression stage of the compressor can be effectively used as air for combustion.

In the gas turbine according to a second aspect of the present invention in order to achieve the above-described object, in the gas turbine according to the first aspect, the low-pressure component is disposed on an axially downstream side, which is a side to which the combustion gas flows, from the first air flow path in the first component.

In the gas turbine according to a third aspect of the present invention in order to achieve the above-described object, in the gas turbine according to the first aspect, the low-pressure component is disposed in a region, in which the first air flow path in the first component exists, in the axial direction.

In the gas turbine according to a fourth aspect of the present invention in order to achieve the above-described object, in the gas turbine according to any one of the first to third aspects, the extraction line is connected to an axially downstream end of the first air flow path, and the component introduction line is connected to an axially upstream end of the first air flow path.

In the gas turbine, the extraction air flows through the first air flow path from the axially downstream side to the axially upstream side. That is, in the gas turbine, the flow of the extraction air is a countercurrent with respect to the flow of the combustion gas. Accordingly, in the gas turbine, it is possible to effectively cool the first component.

In the gas turbine according to a fifth aspect of the present invention in order to achieve the above-described object, in the gas turbine according to any one of the first to fourth aspects, the second air flow path of the low-pressure component is formed such that the extraction air from the component introduction line is able to flow to a combustion gas flow path through which the combustion gas flows.

In the gas turbine according to a sixth aspect of the present invention in order to achieve the above-described object, in the gas turbine according to any one of the first to fifth aspects, each of the plurality of vane rows includes a plurality of vanes which are arranged in a circumferential direction with respect to the axis, and the low-pressure component is a plurality of vanes configuring a vane row, which is disposed on the axially downstream side from the first air flow path, among the plurality of vane rows.

In the gas turbine according to a seventh aspect of the present invention in order to achieve the above-described object, in the gas turbine according to the sixth aspect, the vane includes a vane body which extends in a radial direction with respect to the axis to form a vane profile, an outer shroud which is provided radially outside the vane body, and an inner shroud which is provided radially inside the vane body. The second air flow path is formed in the plurality of vanes configuring the low-pressure component, and the extraction air from the component introduction line flows from the outer shroud into the second air flow path and flows out through the second air flow path from the inner shroud via the vane body.

In the gas turbine, the plurality of vanes which are the low-pressure component can be cooled by the extraction air flowing through the second air flow path, and it is possible to prevent the combustion gas flowing through the combustion gas flow path from flowing into a so-called disk cavity by the extraction air flowing out from the second air flow path.

In the gas turbine according to an eighth aspect of the present invention in order to achieve the above-described object, in the gas turbine according to any one of the first to fifth aspects, the turbine rotor includes a rotor shaft which extends in the axial direction about the axis and a plurality of blade rows which are arranged at intervals in the axial direction. The low-pressure component is a plurality of blades configuring at least one blade row which is disposed under the pressure environment lower than the pressure of the compressed air at the outlet of the intermediate compression stage, among the plurality of blade rows. A third air flow path which extends from an axial end of the rotor shaft to the plurality of blades configuring the low-pressure component is formed in the rotor shaft, and the component introduction line includes the third air flow path of the rotor shaft.

In the gas turbine according to a ninth aspect of the present invention in order to achieve the above-described object, in the gas turbine according to any one of the first to eighth aspects, the turbine rotor includes a rotor shaft which extends in the axial direction about the axis and a plurality of blade rows which are arranged at intervals in the axial direction. The turbine casing includes a plurality of ring segments which face the blade rows in the radial direction with respect to the axis, a vane ring which supports the plurality of ring segments and the plurality of vane rows from a radially outer side, and a casing main body which supports the vane ring from the radially outer side. The first component is the vane ring.

In the gas turbine according to a tenth aspect of the present invention in order to achieve the above-described object, in the gas turbine according to the ninth aspect, the vane ring is an integrally formed product in the axial direction in a region in which the first air flow path is formed.

In the gas turbine according to an eleventh aspect of the present invention in order to achieve the above-described object, in the gas turbine according to any one of the first to tenth aspects, the gas turbine further includes a bypass line which is connected to the extraction line and the component introduction line and bypasses the first air flow path, and through which the extraction air which has flowed into the extraction line is introduced to the component introduction line, and a switcher which is configured to perform switching between a steady state where the extraction air which has flowed into the extraction line flows into the first air flow path and a bypass state where the extraction air which has flowed into the extraction line flows into the low-pressure component via the bypass line and the component introduction line.

In the gas turbine, by setting the switcher to the steady state, the extraction air flows to the first component and the low-pressure component, and thus, it is possible to cool the first component and the low-pressure component. Moreover, in the gas turbine, by setting the switcher to the bypass state, the extraction air does not flow to the first component and flows to only the low-pressure component, and thus, it is possible to cool the second component without cooling the first component. Accordingly, in the gas turbine, a state where the first component is cooled while the second component is cooled and a state where the first component is not cooled while the second component is cooled can be realized. Therefore, in the gas turbine, it is possible to further limit change of the inner diameter of the turbine casing.

In the gas turbine according to a twelfth aspect of the present invention in order to achieve the above-described object, in the gas turbine according to the eleventh aspect, the gas turbine further includes a cooling controller which is configured to output a command to the switcher such that the state becomes the bypass state until an output of the gas turbine or an output correlation value which is a parameter having correlation with the output becomes a first value after the turbine starts, and outputs a command to the switcher such that the state becomes the steady state if the output correlation value exceeds the first value.

In a state where the output correlation value exceeds the first value, the combustion gas having a high temperature flows to the combustion gas flow path. Meanwhile, in a state where the output correlation value does not exceed the first value, the combustion gas having a high temperature does not flow. Accordingly, in the gas turbine, it is possible to suppress reduction of the inner diameter of the turbine casing when the combustion gas having a high temperature does not flow through the combustion gas flow path while it is possible to suppress increase of the inner diameter of the turbine casing caused by thermal expansion when the combustion gas having a high temperature flows through the combustion gas flow path. Accordingly, in the gas turbine, it is possible to further decrease the steady clearance.

In the gas turbine according to a thirteenth aspect of the present invention in order, to achieve the above-described object, in the gas turbine according to any one of the first to tenth aspects, the gas turbine further includes a heating device which is configured to heat the first component, and a heating controller which is configured to cause, in a start process of the turbine, the heating device to heat the first component until an output of the gas turbine or an output correlation value which is a parameter having correlation with the output becomes a first value at the latest from when the turbine rotor starts an increase in a speed and stops heating of the first component of the heating device if the output correlation value exceeds the first value.

In the gas turbine, the first component is heated before the turbine rotor starts to be rotated at a high speed and the inner diameter of the turbine casing increases, and thus, even in a case where the steady clearance is small and the gas turbine hot-starts, it is possible to prevent the tip clearance from being 0 or a significantly small value.

In the gas turbine according to a fourteenth aspect of the present invention in order to achieve the above-described object, in the gas turbine according to the thirteenth aspect, the heating device is capable of heating the first component independently of start and stop operations of the compressor, and the heating controller is configured to cause, in the start process of the turbine, the heating device to heat the first component until the output correlation value becomes the first value from a predetermined time before the turbine rotor starts the increase in the speed.

In the gas turbine, the inner diameter of the turbine casing can increase when the turbine rotor starts to be rotated at a high speed.

In the gas turbine according to a fifteenth aspect of the present invention in order to achieve the above-described object, in the gas turbine according to the fourteenth aspect, the heating device is a heater which is provided in the extraction line or the first component and is configured to generate heat.

In the gas turbine according to a sixteenth aspect of the present invention in order to achieve the above-described object, in the gas turbine according to the thirteenth or fourteenth aspect, the heating device includes a high-temperature air line which is connected to the extraction line and through which air having a temperature higher than that of the extraction air extracted from the intermediate compression stage flows, and a switcher, and the switcher is configured to perform switching between a heating state where air from the high-temperature air line flows into the first air flow path via the extraction line and a steady state where the extraction air which has flowed into the extraction line flows into the first air flow path and air from the high-temperature air line does not flow into the extraction line, and the heating controller is configured to control an operation of the switcher.

In the gas turbine according to a seventeenth aspect of the present invention in order to achieve the above-described object, there is provided a component-temperature adjustment method of a gas turbine including: a compressor which includes a plurality of compression stages and is configured to sequentially compress air at each of the compression stages; a combustor which is configured to combust a fuel in air compressed by the compressor to generate a combustion gas, and a turbine which includes a turbine rotor which is rotated about an axis by the combustion gas, a tubular turbine casing which covers the turbine rotor, and a plurality of vane rows which are fixed to an inner peripheral side of the turbine casing. The method includes: a first air cooling step of extracting the compressed air from an intermediate compression stage among the plurality of compression stages as an extraction air and causing the extraction air to flow into a first component configuring a portion of the turbine casing; and a second air cooling step of causing the extraction air which has passed through the first component to flow into a second component, which is different from the first component, among components configuring the turbine. The second component is a low-pressure component which is disposed under a pressure environment lower than a pressure of the compressed air at an outlet of the intermediate compression stage.

In the component-temperature adjustment method, while the combustion gas flows through the combustion gas flow path in the turbine casing, the extraction air is introduced to the first component via the extraction line, and thus, the first component can be cooled. Accordingly, even when the combustion gas flows through the combustion gas flow path, in the present embodiment, it is possible to prevent the inner diameter of the turbine casing from increasing due to the thermal expansion. Accordingly, in the component-temperature adjustment method, it is possible to suppress a change of the tip clearance, and as a result, it is possible to decrease the steady clearance.

In the component-temperature adjustment method, the compressed air having a high temperature and a high pressure discharged from the compressor via the final compression stage of the compressor does not flow to the first component, and the compressed air from the intermediate compression stage of the compressor flows to the first component, as the extraction air. Therefore, in the component-temperature adjustment method, the compressed air from the intermediate compression stage of the compressor can be used as it is for cooling the first component without being cooled by a cooler.

Moreover, in the component-temperature adjustment method, the second component to which the extraction air which has passed through the first component flows is the low-pressure component disposed under a pressure environment lower than the pressure of the compressed air at the outlet of the intermediate compression stage. Therefore, in the gas turbine, even when the compressed air from the compressor is not boosted by a booster, the extraction air which has passed through the first component flows to the low-pressure component, and thus, it is possible to cool the low-pressure component.

Accordingly, in the component-temperature adjustment method, the first component configuring a portion of the turbine casing is cooled to decrease the steady clearance, the low-pressure component which is the second component different from the first component is cooled, and thus, it is possible to decrease equipment cost Moreover, in the component-temperature adjustment method, the first component and the low-pressure component are cooled by the compressed air from the intermediate compression stage of the compressor, and thus, for example; the compressed air having a high temperature and a high pressure discharged from the compressor via the final compression stage of the compressor can be effectively used as air for combustion.

In the component-temperature adjustment method of a gas turbine according to an eighteenth aspect of the present invention in order to achieve the above-described object, in the component-temperature adjustment method of a gas turbine according to the seventeenth aspect, the low-pressure component is disposed on an axially downstream side, which is a side to which the combustion gas flows, from a first region of the first component through which the extraction air flows.

In the component-temperature adjustment method of a gas turbine according to a nineteenth aspect of the present invention in order to achieve the above-described object, in the component-temperature adjustment method of a gas turbine according to the eighteenth aspect, the low-pressure component is disposed in a range, in which a first region of the first component through which the extraction air flows exists, in the axial direction.

In the component-temperature adjustment method of a gas turbine according to a twentieth aspect of the present invention in order to achieve the above-described object, in the component-temperature adjustment method of a gas turbine according to any one of the seventeenth to nineteenth aspects, in the first air cooling step, the extraction air flows to an axially upstream side in the first component.

In the component-temperature adjustment method of a gas turbine according to a twenty-first aspect of the present invention in order to achieve the above-described object, in the component-temperature adjustment method of a gas turbine according to any one of the seventeenth to twentieth aspects, in the second air cooling step, the extraction air which has flowed to the low-pressure component flows to a combustion gas flow path through which the combustion gas flows.

In the component-temperature adjustment method of a gas turbine according to a twenty-second aspect of the present invention in order to achieve the above-described object, in the component-temperature adjustment method of a gas turbine according to any one of the seventeenth to twenty-first aspects, each of the plurality of vane rows includes a plurality of vanes which are arranged in a circumferential direction with respect to the axis, and the low-pressure component is a plurality of vanes configuring at least one vane row which is disposed under the pressure environment lower than the pressure of the compressed air at the outlet of the intermediate compression stage, among the plurality of vane rows.

In the component-temperature adjustment method of a gas turbine according to a twenty-third aspect of the present invention in order to achieve the above-described object, in the component-temperature adjustment method of a gas turbine according to the twenty-second aspect, the vane includes a vane body which extends in a radial direction with respect to the axis to form a vane profile, an outer shroud which is provided radially outside the vane body, and an inner shroud which is provided radially inside the vane body, and in the second air cooling step, the extraction air which has passed through the first component flows from the outer shroud of the vane configuring the low-pressure component into the vane and flows out from the inner shroud of the vane via the vane body of the vane.

In the component-temperature adjustment method of a gas turbine according to a twenty-fourth aspect of the present invention in order to achieve the above-described object, in the component-temperature adjustment method of a gas turbine according to any one of the seventeenth to twenty-first aspects, the turbine rotor includes a rotor shaft which extends in the axial direction about the axis and a plurality of blade rows which are arranged at intervals in the axial direction, and the low-pressure component is a plurality of blades configuring at least one blade row which is disposed under the pressure environment lower than the pressure of the compressed air at the outlet of the intermediate compression stage, among the plurality of blade rows.

In the component-temperature adjustment method of a gas turbine according to a twenty-fifth aspect of the present invention in order to achieve the above-described object, in the component-temperature adjustment method of a gas turbine according to any one of the seventeenth to twenty-fourth aspects, the turbine rotor includes a rotor shaft which extends in the axial direction about the axis and a plurality of blade rows which are arranged at intervals in the axial direction. The turbine casing includes a plurality of ring segments which are positioned radially outside the axis and face the plurality of blade rows in the radial direction, a vane ring which supports the plurality of ring segments from a radially outer side, and a casing main body which supports the vane ring from the radially outer side. The first component is the vane ring.

In the component-temperature adjustment method of a gas turbine according to a twenty-sixth aspect of the present invention in order to achieve the above-described object, in the component-temperature adjustment method of a gas turbine according to any one of the seventeenth to twenty-fifth aspects, if an output of the gas turbine or an output correlation value which is a parameter having correlation with the output exceeds a first value, the first air cooling step and the second air cooling step are performed.

In a state where the output correlation value exceeds the first value, the combustion gas having a high temperature flows to the combustion gas flow path. Accordingly, in the component-temperature adjustment method, it is possible to suppress an increase of the inner diameter of the turbine casing caused by thermal expansion when the combustion gas having a high temperature flows through the combustion gas flow path. Accordingly, in the component-temperature adjustment method, it is possible to decrease the steady clearance.

In the component-temperature adjustment method of a gas turbine according to a twenty-seventh aspect of the present invention in order to achieve the above-described object, in the component-temperature adjustment method of a gas turbine according to the twenty-sixth aspect, the method further includes a third air cooling step of causing the extraction air from the intermediate compression stage to flow to the low-pressure component without causing the extraction air to flow through the first component until the output correlation value becomes the first value after the turbine starts.

In the component-temperature adjustment method, it is possible to suppress the reduction of the inner diameter of the turbine casing or increase the inner diameter of the turbine casing when the combustion gas having a high temperature does not flow through the combustion gas flow path. Accordingly, in the component-temperature adjustment method, it is possible to decrease the steady clearance.

In the component-temperature adjustment method of a gas turbine according to a twenty-eighth aspect of the present invention in order to achieve the above-described object, in the component-temperature adjustment method of a gas turbine according to the twenty-sixth aspect or the twenty-seventh aspect, while the first air cooling step and the second air cooling step are performed, if the output correlation value is less than a second value smaller than the first value, the first air cooling step and the second air cooling step stop, and the third air cooling step of causing the extraction air from the intermediate compression stage to flow to the low-pressure component is performed without causing the extraction air to flow through the first component.

In the component-temperature adjustment method of a gas turbine according to a twenty-ninth aspect of the present invention in order to achieve the above-described object, in the component-temperature adjustment method of a gas turbine according to the twenty-seventh aspect or the twenty-eighth aspect, in the third air cooling step, the extraction air which has passed through the low-pressure component flows to the combustion gas flow path through which the combustion gas flows.

In the component-temperature adjustment method of a gas turbine according to a thirtieth aspect of the present invention in order to achieve the above-described object, in the component-temperature adjustment method of a gas turbine according to the twenty-sixth aspect, in a start process of the turbine, a heating step of heating the first component is performed until the output correlation value becomes the first value at the latest from when the turbine rotor starts an increase in a speed and of stopping heating of the first component if the output correlation value exceeds the first value.

In the component-temperature adjustment method, the first component is heated before the turbine rotor starts to be rotated at a high speed and the inner diameter of the turbine casing increases, and thus, even in a case where the steady clearance is, small and the gas turbine hot-starts, it is possible to prevent the tip clearance from being 0 or a significantly small value.

In the component-temperature adjustment method of a gas turbine according to a thirty-first aspect of the present invention in order to achieve the above-described object, in the component-temperature adjustment method of a gas turbine according to the thirtieth aspect, the gas turbine includes a heating device capable of heating the first component independently of start and stop operations of the compressor. In the heating step, in the start process of the turbine, the heating device heats the first component until the output correlation value becomes the first value from a predetermined time before the turbine rotor starts the increase in the speed.

In the gas turbine, the inner diameter of the turbine casing can increase when the turbine rotor starts to be rotated at a high speed.

In the component-temperature adjustment method of a gas turbine according to a thirty-second aspect of the present invention in order to achieve the above-described object, in the component-temperature adjustment method of a gas turbine according to the thirty-first aspect, the heating device is a heater which is configured to generate heat.

Advantageous Effects of Invention

According to an aspect of the present invention, it is possible to effectively use the compressed air having a high temperature and a high pressure while decreasing the equipment cost of the gas turbine.

DESCRIPTION OF EMBODIMENTS

Hereinafter, various embodiments of a gas turbine according to the present invention will be described in detail with reference to the drawings.

First Embodiment

A first embodiment of the gas turbine according to the present invention will be described with reference to FIGS. 1 to 5.

Figure 1:
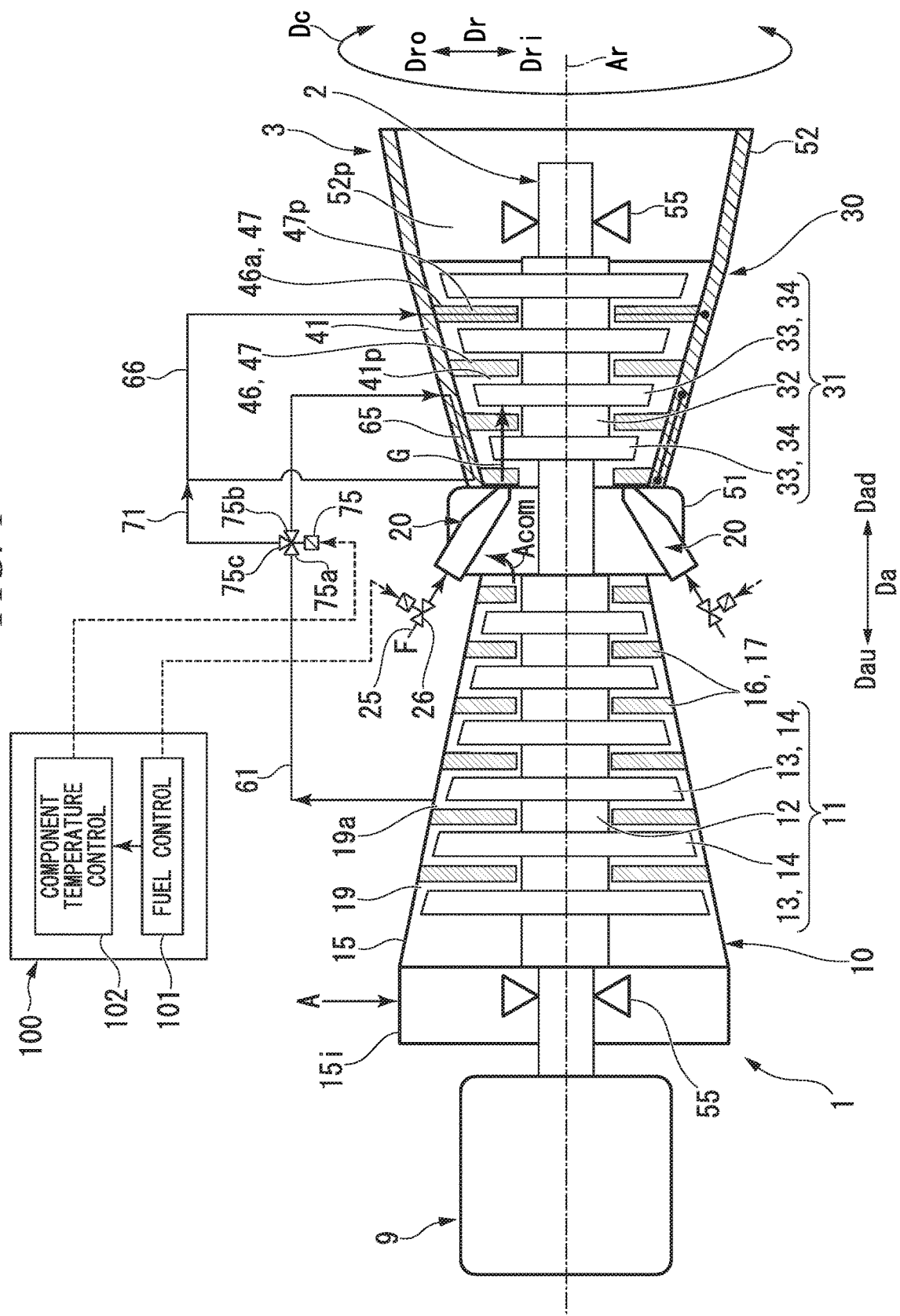
FIG. 1 is a schematic cross-sectional view of a gas turbine in a first embodiment according to the present invention.

As shown in FIG. 1, a gas turbine 1 of the present embodiment includes a compressor 10 which compresses an outside air A to generate a compressed air Acom, a combustor 20 which is configured to combust a fuel F from a fuel supply source in the compressed air Acom to generate a combustion gas G, and a turbine 30 which is driven by the combustion gas G.

The compressor 10 includes a compressor rotor 11 which is rotated about an axis Ar and a tubular compressor casing 15 which covers the compressor rotor 11. In addition, hereinafter, a direction in which the axis Ar extends is referred to as an axial direction Da. Moreover, one side in the axial direction Da is referred to as an axially upstream side Dau, and the other side in the axial direction Da is referred to as an axially downstream side Dad. A radial direction with respect to the axis Ar is simply referred to as a radial direction Dr. Moreover, a side away from the axis Ar in the radial direction Dr is referred to as a radially outer side Dro and a side approaching the axis Ar in the radial direction Dr is referred to as a radially inner side Dri.

An opening is formed in a portion on the axially upstream side Dau of the compressor casing 15. The opening forms an air intake port 15i through which the compressor 10 takes in the outside air A from the outside of the compressor 10. A plurality of vane rows 16 are fixed to the radially inner side Dri of the compressor casing 15. The plurality of the vane rows 16 are arranged at intervals in the axial direction Da. Each of the plurality of vane rows 16 includes a plurality of vanes 17 which are arranged in a circumferential direction Dc with respect to the axis Ar. The compressor rotor 11 includes a rotor shaft 12 which extends in the axial direction Da about the axis Ar and a plurality of blade rows 13 which are fixed to an outer periphery of the rotor shaft 12. Each blade row 13 is disposed on the axially upstream side. Dau of the vane row 16. Each of the plurality of blade rows 13 includes a plurality of blades 14 which are arranged in the circumferential direction Dc. One compression stage 19 is configured by one blade row 13 and one vane row 16 which is adjacent to the axially downstream side Dad of the one blade row 13. The compressor 10 of the present embodiment includes an axial compressor having a plurality of compression stages 19.

The turbine 30 is disposed on the axially downstream side Dad of the compressor 10. The turbine 30 includes a turbine rotor 31 which rotates about the axis Ar and a tubular turbine casing 41 which covers the turbine rotor 31. A plurality of vane rows 46 are fixed to the radially inner side Dri of the turbine casing 41. The plurality of vane rows 46 are arranged at intervals in the axial direction Da. Each of the plurality of vane rows 46 includes a plurality of vanes 47 which are arranged in the circumferential direction Dc. The turbine rotor 31 includes a rotor shaft 32 which extends in the axial direction Da about the axis Ar and a plurality of blade rows 33 which are fixed to an outer periphery of the rotor shaft 32.

Each blade row 33 is disposed on the axially downstream side Dad of the vane row 46. Each of the plurality of blade rows 33 includes a plurality of blades 34 which are arranged in the circumferential direction Dc.

Moreover, the gas turbine 1 of the present embodiment includes an intermediate casing 51, an exhaust chamber 52, and bearings 55. The intermediate casing 51 is disposed between the compressor casing 15 and the turbine casing 41 in the axial direction Da. The exhaust chamber 52 is disposed on the axially downstream side Dad of the turbine casing 41. The compressor casing 15, the intermediate casing 51, the turbine casing 41, and the exhaust chamber 52 are connected to each other to configure the gas turbine casing 3. The compressor rotor 11 and the turbine rotor 31 are integrally rotated with each other about the same axis Ar. The compressor rotor 11 and the turbine rotor 31 configure the gas turbine rotor 2. The gas turbine rotor 2 is supported by the bearings 55 on both ends in the axial direction Da. For example, a rotor of a generator 9 is connected to the gas turbine rotor 2.

The combustor 20 is fixed to the intermediate casing 51. A fuel line 25 through which the fuel F is supplied to the combustor 20 is connected to the combustor 20. A fuel regulating valve 26 which regulates a flow rate of the fuel is provided in the fuel line 25.

In addition, the gas turbine 1 of the present embodiment includes an extraction line 61, a component introduction line 66, a bypass line 71, a switcher 75, and a controller 100. A compressed air from an intermediate compression stage 19a among the plurality of compression stages 19 of the compressor 10 is extracted through the extraction line 61 as an extraction air. The extraction air is introduced to a first component configuring a portion of the turbine casing 41 through the extraction line 61. In addition, the intermediate compression stage 19a is any one compression stage 19 among the compression stages 19 excluding the compression stage 19 on the most axially upstream side Dau and the compression stage 19 on the most axially downstream side Dad among the plurality of compression stages 19. The extraction air, which has passed through the first component, is introduced to a second component different from the first component of the components configuring the turbine 30 through the component introduction line 66. The bypass line 71 is connected to the extraction line 61 and the component introduction line 66 and bypasses the first component, and the extraction air is introduced to the component introduction line 66 through the bypass line 71. The switcher 75 performs switching between a steady state where the extraction air which has flowed into the extraction line 61 flows into the first component and a bypass state where the extraction air which has flowed into the extraction line 61 flows into the second component via the extraction line 61, the bypass line 71, and the component introduction line 66. The switcher 75 is configured with a three-way valve. Accordingly, hereinafter, this three-way valve is described as a three-way valve 75. The three-way valve 75 is provided at a connection position between the extraction line 61 and the bypass line 71. In three openings of the three-way valve 75, a first opening 75a is connected to a line on the compressor 10 side in the extraction line 61, and a second opening 75b is connected to a line of the turbine 30 side in the extraction line 61. Moreover, a third opening 75c is connected to the bypass line 71. In addition, the switcher 75 may not be three-way valve, and for example, can be configured with a two-way valve. The controller 100 includes a fuel control unit includes a fuel control unit 101 which controls the fuel regulating valve 26 and a component temperature control unit (cooling controller) 102 which controls the switcher 75.

Figure 2:
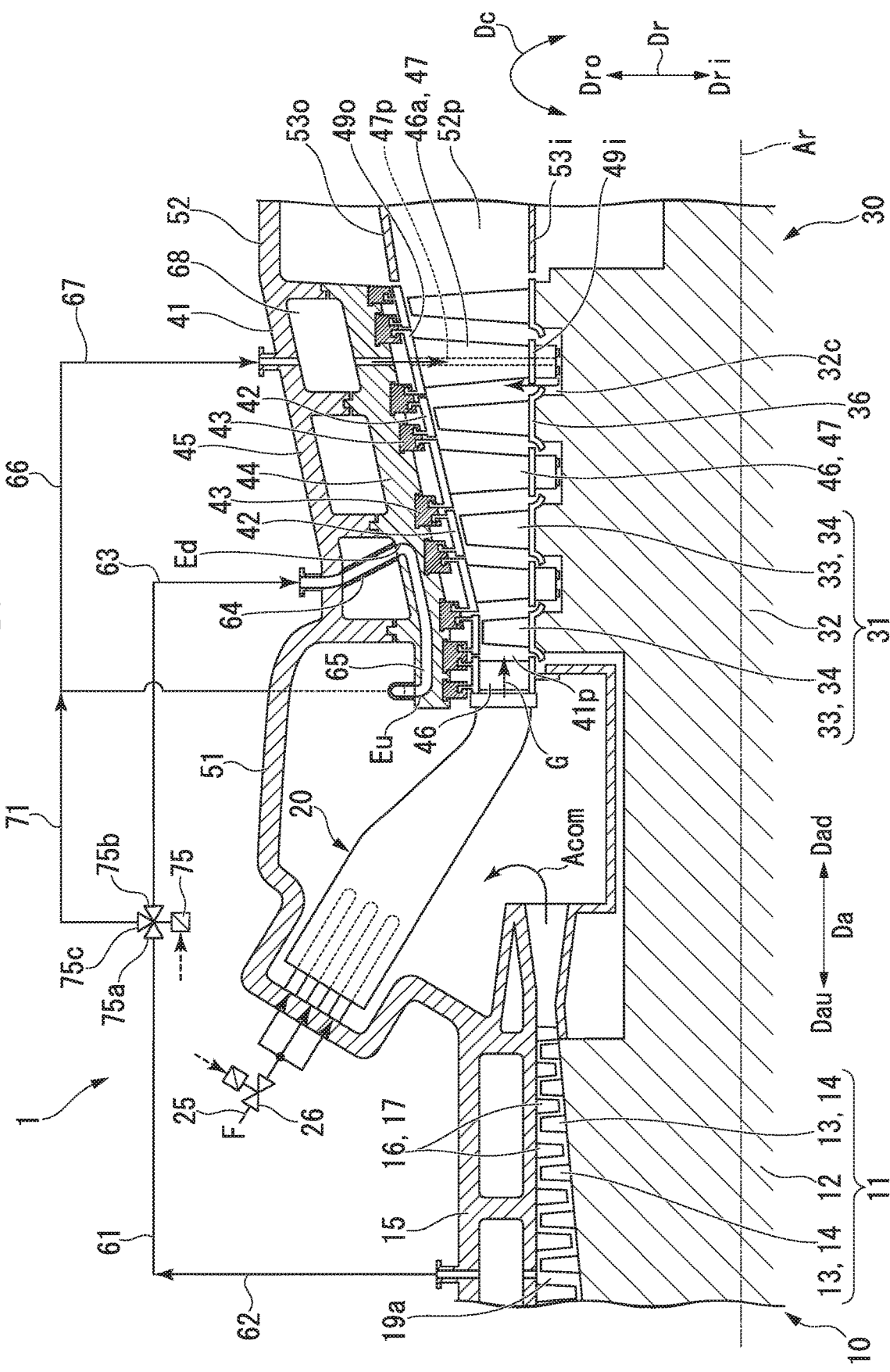
FIG. 2 is a main cross-sectional view of the gas turbine in the first embodiment according to the present invention.

As shown in FIG. 2, the turbine casing 41 includes a plurality of ring segments 42, a plurality of isolation rings 43, a vane ring 44 which is the first component, and a casing main body 45. Each of the ring segments 42 is positioned on the radially outer side Dro of the blade row 33 and faces the blade row 33 in the radial direction Dr. The vane ring 44 is formed in an annular shape about the axis Ar and is positioned on the radially outer side Dro of the plurality of ring segments 42. Each of the isolation ring 43 is positioned between the ring segment 42 and the vane 47, and the vane ring 44 in the radial direction Dr, and connects the ring segment 42 and the vane 47, and the vane ring 44 to each other. Accordingly, the ring segment 42 and the vane 47 are supported by the vane ring 44 via the isolation ring 43 from the radially outer side Dro. The casing main body 45 is formed in an annular shape about the axis Ar and is positioned on the radially outer side Dro of the vane ring 44. The casing main body 45 supports the vane ring 44 from the radially outer side Dro. The intermediate casing 51 is connected to the axially upstream side Dau of the casing main body 45. Moreover, the exhaust chamber 52 is connected to the axially downstream side Dad of the casing main body 45. In the exhaust chamber 52, an annular inner diffuser 53i and an outer diffuser 53o are disposed about the axis Ar. A portion of the axially downstream side Dad of the turbine rotor 31 is disposed on the radially inner side Dri of the inner diffuser 53i. An inner diameter of the outer diffuser 53o is larger than an outer diameter of the inner diffuser 53i. The outer diffuser 53o is disposed on the radially outer side Dro of the inner diffuser 53i with a gap therebetween. An annular space between the radially outer side Dro of the inner diffuser 53i and the radially inner side Dri of the outer diffuser 53o forms a combustion gas flow path 52p.

Figure 3:
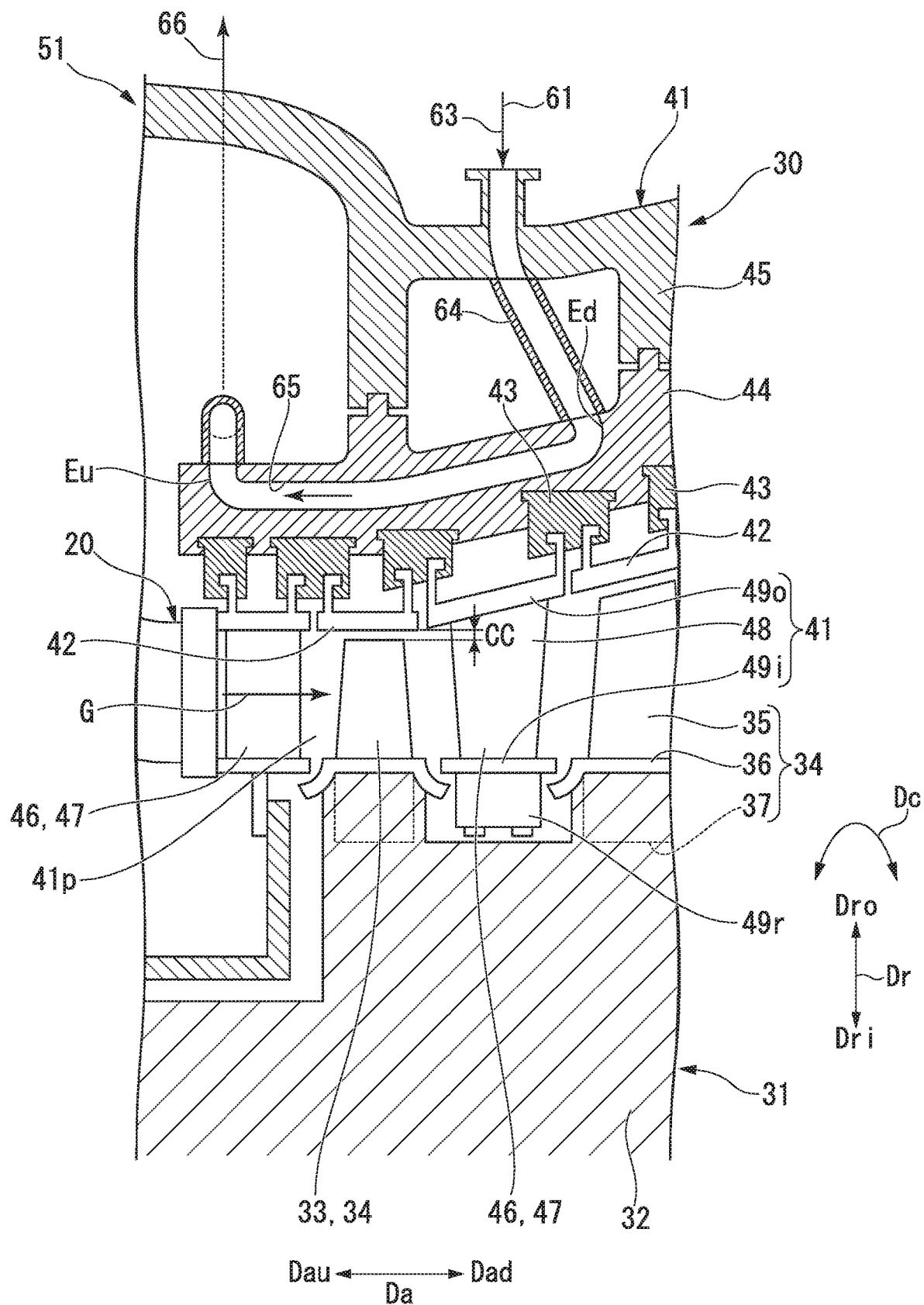
FIG. 3 is a main cross-sectional view of the turbine in the first embodiment according to the present invention.

As shown in FIG. 3, the vane 47 includes a vane body 48 which extends in the radial direction Dr to form a vane profile, an outer shroud 49o which is provided on the radially outer side Dro of the vane body 48, and an inner shroud 49i which is provided on the radially inner side Dri of the vane body 48. A seal ring 49r is provided on the radially inner side Dri of the inner shroud 49i. The combustion gas G from the combustor 20 flows between the outer shroud 49o and the inner shroud 49i. The blade 34 includes a blade body 35 which extends in the radial direction Dr to faun the blade profile, a platform 36 which is provided on the radially inner side Dri of the blade body 35, and a blade root 37 which is provided on the radially inner side Dri of the platform 36. The blade root 37 of the blade 34 is fitted into the rotor shaft 32. The combustion gas G flows between the platform 36 of the blade 34 and the ring segment 42 which is positioned on the radially outer side Dro of the blade 34. Accordingly, a combustion gas flow path 41p through which the combustion gas G flows is defined by the outer shroud 49o and the inner shroud 49i of the vane 47, the platform 36 of the blade 34, and the ring segment 42. The combustion gas flow path 41p is formed in an annular shape about the axis Ar. An edge of the radially outer side Dro of the combustion gas flow path 41p is determined by the outer shroud 49o of the vane 47 and the ring segment 42. In addition, an edge of the radially inner side Dri of the combustion gas flow path 41p is determined by the inner shroud 49i of the vane 47 and the platform 36 of the blade 34. The combustion gas flow path 41p is connected to the combustion gas flow path 52p between the inner diffuser 53i and the outer diffuser 53o described above.

A vane ring air flow path (first air flow path or first region) 65 which spreads in the circumferential direction Dc and the axial direction Da is formed in the annular vane ring 44 which is the first component. That is, the vane ring air flow path 65 extends in the circumferential direction Dc and the axial direction Da in the vane ring 44. A position of an axially upstream end Eu of the vane ring air flow path 65 in the axial direction Da is a position at which the first stage vane row 46 is provided in the axial direction Da. A position of an axially downstream end Ed of the vane ring air flow path 65 in the axial direction Da is a position between the second stage vane row 46 and the second stage blade row 33 in the axial direction Da.

As shown in FIG. 2, a first end of the extraction line 61 is connected to a position of the radially outer side Dro of the intermediate compression stage 19a in the compressor casing 15. A second end of the extraction line 61 is connected to the axially downstream end Ed of the vane ring air flow path 65. Accordingly, the compressed air which is compressed up to the intermediate compression stage 19a of the compressor 10 can flow into the vane ring air flow path 65 via the extraction line 61 as the extraction air. A flow path of the extraction line 61 is formed of a flow path in a first extraction pipe 62, a flow path in a second extraction pipe 63, and a flow path in a third extraction pipe 64. The first extraction pipe 62 is connected to the position of the radially outer side Dro of the intermediate compression stage 19a in the turbine casing 41 and is connected to the first opening 75a of the three-way valve 75 which is the switcher. The second extraction pipe 63 is connected to the second opening 75b of the three-way valve 75 which is the switcher and is connected to the casing main body 45 of the turbine casing 41. The third extraction pipe 64 is connected to the casing main body 45 of the turbine casing 41 and is connected to the axially downstream end Ed of the vane ring air flow path 65. The second extraction pipe 63 and the third extraction pipe 64 communicate with each other.

The plurality of vanes 47 configuring a fourth, stage vane row 46a are a low-pressure component. A vane air flow path (second air flow path) 47p is formed in the plurality of vanes 47 which are the low-pressure component. The vane air flow path 47p opens on a surface of the radially outer side Dro in the outer shroud 49o of the vane 47 and opens on a surface of the radially inner side Dri in the inner shroud 49i of the vane 47. A first end of the component introduction line 66 is connected to the axially upstream end Eu of the vane ring air flow path 65. A second end of the component introduction line 66 is connected to an opening of the vane air flow path 47p in the outer' shroud 49o of the plurality of vanes 47 configuring the fourth stage vane row 46a. Accordingly, the compressed air which is compressed up to the intermediate compression stage 19a of the compressor 10 can flow into the vane air flow path 47p as the extraction air via the first extraction pipe 62 of the extraction line 61, the bypass line 71, and the component introduction line 66. A flow path of the component introduction line 66 is formed of a flow path of a reuse pipe 67 and a casing air flow path 68. The reuse pipe 67 is connected to the axially upstream end Eu of the vane ring air flow path 65 and is connected to the casing main body 45 of the turbine casing 41. The bypass line 71 is connected to the reuse pipe 67. The casing air flow path 68 is a flow path which is formed in the casing main body 45 and the vane ring 44 of the turbine casing 41. The casing air flow path 68 communicates with the reuse pipe 67, and the extraction air from the reuse pipe 67 is introduced to the vane air flow path 47p of the plurality of vanes 47 configuring the fourth stage vane row 46a through the casing air flow path 68.

Next, an operation of the above-described gas turbine 1 will be described.

As shown in FIG. 1, if the compressor rotor 11 is rotated, the outside air A from the air intake port 15i of the compressor 10 flows into the compressor casing 15. As the outside air A flows through the compressor casing 15 from the axially upstream side Dau to the axially downstream side Dad, the outside air A is sequentially compressed by the plurality of compression stages 19 so as to be the compressed air Acom. The compressed air Acom flows from the compressor casing 15 into the intermediate casing 51.

The compressed air Acom which has flowed into the intermediate casing 51 flows into the combustor 20. The fuel F is supplied from the fuel supply source to the combustor 20. In the combustor 20, the fuel F is combusted in the compressed air Acom, and thus, the combustion gas G having a high temperature and a high pressure is generated.

The combustion gas G having a high temperature and a high pressure flows from the combustor 20 into the combustion gas flow path 41p of the turbine 30. As the combustion gas G flows through the combustion gas flow path 41p, the combustion gas G rotates the turbine rotor 31. The temperature of the combustion gas G when flowing from the combustor 20 into the combustion gas flow path 41p of the turbine 30 is about thousand degrees Celsius(for example, 800to 1600 degrees Celsius). The temperature of the combustion gas G gradually decreases as the combustion gas G flows through the combustion gas flow path 41p.

Meanwhile, as shown in FIG. 3, a clearance is required between a radially outer end of the blade 34 and an inner peripheral surface of the turbine casing 41 facing the blade 34 in the radial direction Dr. In general, this clearance is referred to as a tip clearance CC, and is preferably as small as possible from the viewpoint of turbine performance.

Mass of the turbine rotor 31, particularly, mass of the rotor shaft 32 is larger than mass of the turbine casing 41. Accordingly, the turbine rotor 31 has a large thermal capacity than that of the turbine casing 41, and a thermal response with respect to the temperature changes of the gas flowing through the combustion gas flow path 41p is lower than that of the turbine casing 41. In addition, the turbine casing 41 is exposed to the outside air, and thus, when the gas turbine stops, compared to the turbine rotor 31 which is not exposed to the outside air, thermal deformation per unit time of the turbine casing 41 is large. Therefore, in a case where the temperature of the gas flowing through the combustion gas flow path 41p is changed, the tip clearance CC is changed due to a difference of the thermal responses between the turbine rotor 31 and the turbine casing 41 or the like. Particularly, the change of the tip clearance CC at the time of starting, stopping, or the like of the gas turbine 1 is large.

In a case where the change of the tip clearance CC is large, it is necessary to increase a steady clearance. In addition, the steady clearance is a tip clearance when a stable operation of the gas turbine 1 continues, and the temperatures of the turbine rotor 31 and the turbine casing 41 are continuously the same as each other. If the steady clearance is large, at the time of the steady state operation of the gas turbine 1, the flow rate of the combustion gas G passing through a portion between the radially outer end of the blade 34 and the inner peripheral surface of the turbine casing 41 increases. Accordingly, if the steady clearance is large, gas turbine performance decreases at the time of the steady state operation of the gas turbine 1.

If a fuel supply to the gas turbine 1 is stopped and the combustion gas G having a high temperature and a high pressure does not flow through the combustion gas flow path 41p, the temperatures of the turbine rotor 31 and the turbine casing 41 decrease. However, as described above, the thermal capacity of the turbine casing 41 is smaller than that of the turbine rotor 31 and the turbine casing 41 is exposed to the outside air, and thus, the temperature of the turbine casing 41 sharply decreases compared to the temperature of the turbine rotor 31. Accordingly, the temperature of the turbine rotor 31 temporarily becomes higher than the temperature of the turbine casing 41. In this state, a tip clearance CC is small. Under this condition, when the gas turbine 1 starts, an outer diameter of the turbine rotor 31 increases due to a centrifugal force acting on the turbine rotor 31, and the tip clearance CC further decreases. That is, in a case where gas turbine 1 hot-starts, tip clearance CC becomes extremely small. Moreover, the radially outer end of the blade 34 and the inner circumferential surface of the turbine casing 41 may come into contact with each other. Therefore, even in the case where the gas turbine 1 hot-starts, it is necessary to determine the steady clearance so as to reliably secure the tip clearance CC.

In the present embodiment, the vane ring 44, which is one of components configuring the turbine casing 41, is cooled by the extraction air under a predetermined condition, changes in an inner diameter of the vane ring 44 decease, and thus, changes in the tip clearance CC decrease.

Figure 4:
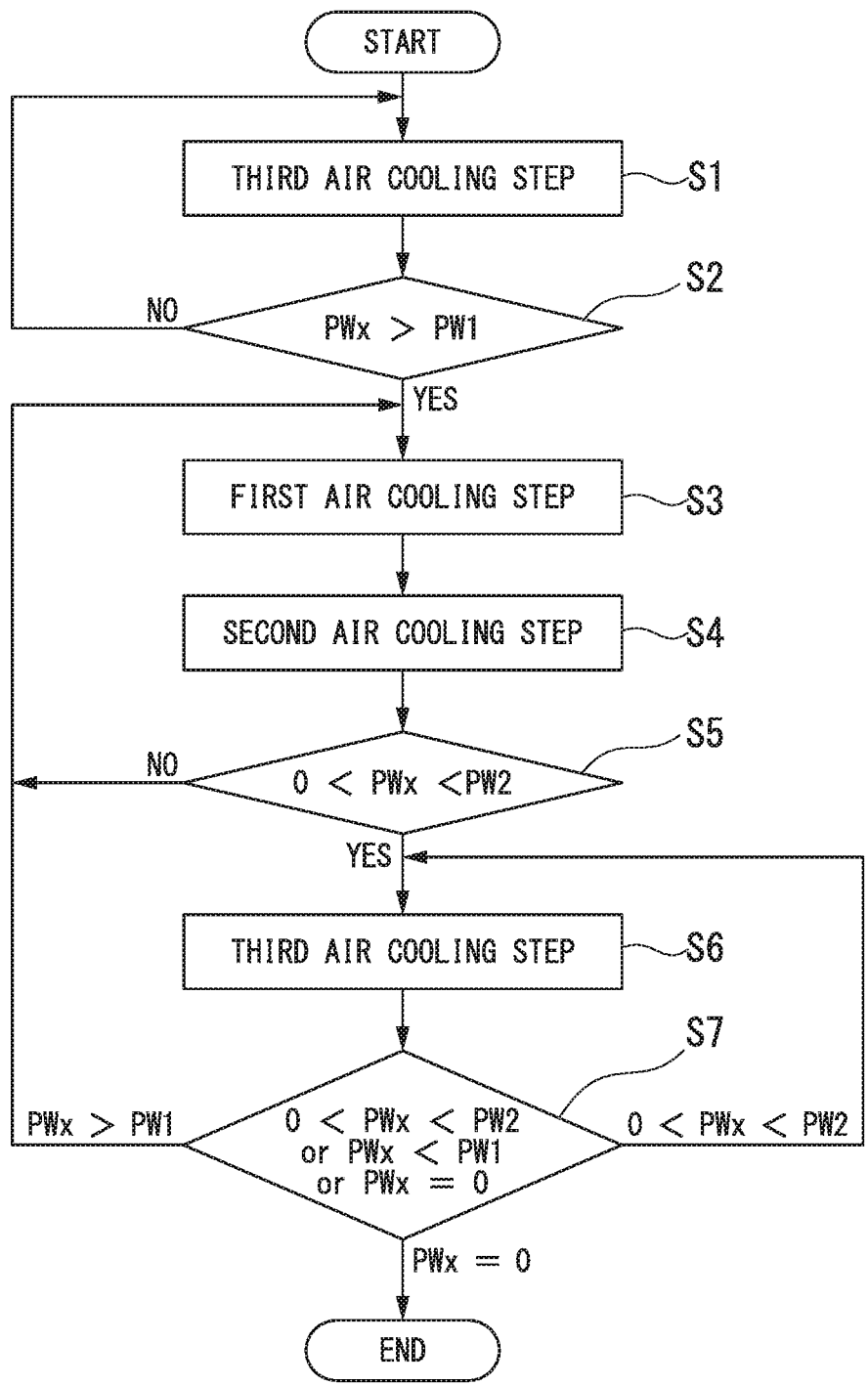
FIG. 4 is a flowchart showing a procedure of a component-temperature adjustment method in the first embodiment according to the present invention.

The component-temperature adjustment method of the gas turbine 1 in the present embodiment will be described in accordance with a flowchart shown in FIG. 4.

Before the gas turbine 1 starts, the three-way valve 75, which is a switcher, communicates with first opening 75a and the third opening 75c, and does not communicate with the first opening 75a and the second opening 75b. That is, the switcher 75 is in the bypass state. When an increase in a speed of the gas turbine rotor 2 starts by driving of a starting device or the like and a rotation speed N of the gas turbine rotor 2 reaches a predetermined rotation speed N1 (see FIG. 5) lower than a rated rotation speed Nr (for example, 3600 rpm), the fuel supply to the combustor 20 starts. As described above, the combustion gas G having a high temperature and a high pressure is generated in the combustor 20, and the combustion gas G flows into the combustion gas flow path 41p.

If the increase in the speed of the gas turbine rotor 2 starts, air is compressed sequentially at the compression stages 19 of the compressor 10. Accordingly, a portion of the compressed air compressed up to the intermediate compression stage 19a is introduced, as extraction air, to the plurality of vanes 47 configuring the fourth stage vane row 46a via the extraction line 61, the switcher 75, the bypass line 71, and the component introduction line 66. In the combustion gas flow path 41p, a pressure between the fourth stage vane row 46a and the third stage blade row 33 is lower than the pressure of the compressed air at the outlet of the intermediate compression stage 19a. Therefore, the extraction air which is the compressed air from the intermediate compression stage 19a flows into a disk cavity 32c between the vane 47 and the rotor shaft 32 through the vane air flow path 47p formed in the vane 47, and thereafter, flows to the combustion gas flow path 41p via a portion between the inner shroud 49i of the vane 47 configuring the fourth stage vane row 46a and the platform 36 of the blade 34 configuring the three stage blade row 33 (S1: third air cooling step). The portion between the inner shroud 49i of the vane 47 configuring the fourth stage vane row 46a and the platform 36 of the blade 34 configuring the three stage blade row 33 is sealed by the extraction air, and the combustion gas G flowing through the combustion gas flow path 41p from the portion therebetween does not flow into the disk cavity 32c.

Figure 5:
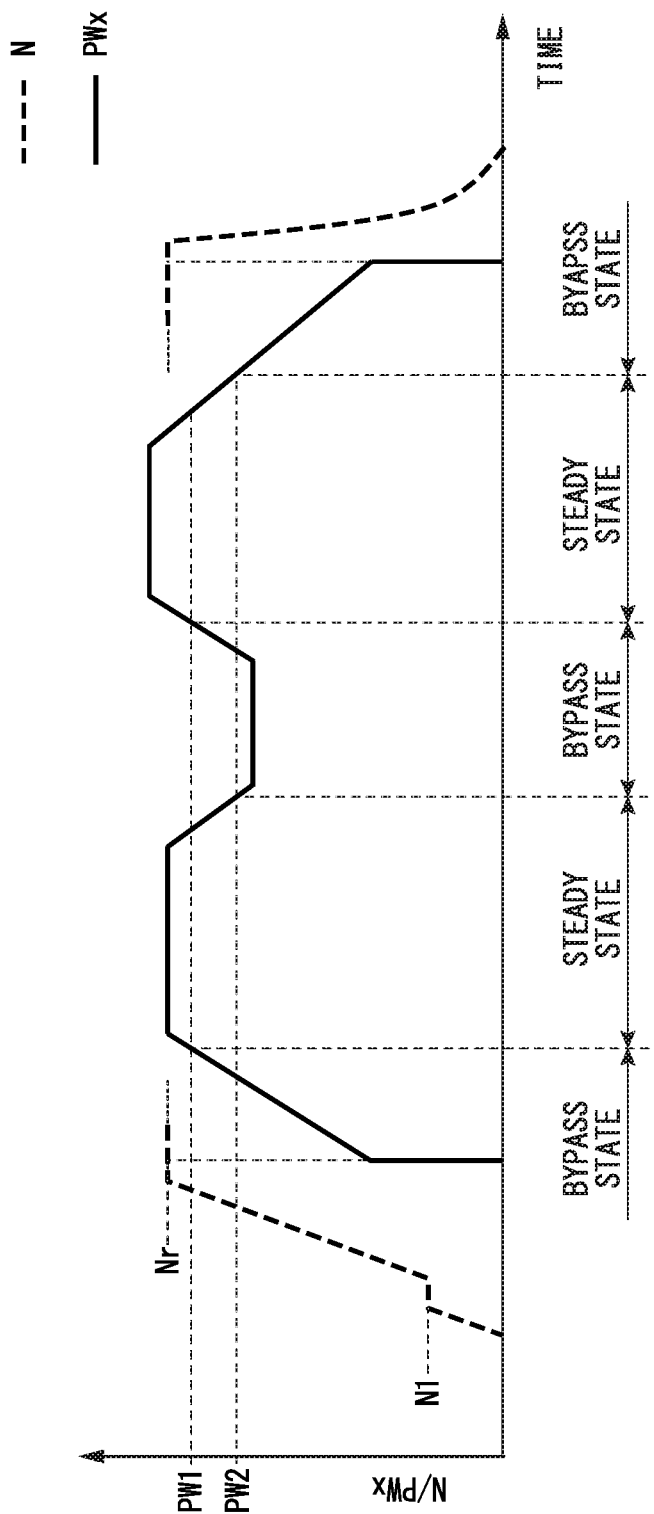
FIG. 5 is an explanatory graph showing a relationship between changes in an output and a rotation speed of the gas turbine over time and a state of a switcher in the first embodiment according to the present invention.

As shown in FIG. 5, if the rotation speed N of the gas turbine rotor 2 becomes the rated rotation speed Nr, the generator 9 connected to the gas turbine rotor 2 is connected to an external electric power system. As a result, a gas turbine output PWx, that is, power from the generator 9 starts to be supplied to the electric power system. The power output from the generator 9 is measured with a wattmeter. In addition the power measured by the wattmeter, that is, the gas turbine output PWx, a load command from the outside or the like is input to the fuel control unit 101 of the controller 100. The fuel control unit 101 determines the flow rate of the fuel supplied to the combustor 20, based on the gas turbine output PWx, the load command, or the like. In addition, the fuel control unit 101 outputs a valve opening degree command to the fuel regulating valve 26, based on the flow rate of the fuel. The component temperature control unit 102 of the controller 100 receives the gas turbine output PWx from the fuel control unit 101 and controls the switcher 75 based on the gas turbine output PWx.

The component temperature control unit 102 determines whether or not the gas turbine output PWx exceeds a predetermined first value PW1 (S2). If the gas turbine output PWx does not exceed the predetermined first value PW1, the component temperature control unit 102 causes the switcher 75 to maintain the bypass state. That is, the component temperature control unit 102 continues the third air cooling step (S1). Meanwhile, if the gas turbine output PWx exceeds the first value PW1, the component temperature control unit 102 outputs a steady state command to the switcher 75 and sets the switcher 75 to the steady state, as shown in FIG. 5. If the three-way valve 75 which the switcher is in the steady state, the first opening 75a and the second opening 75b communicate with each other, and the first opening 75a and the third opening 75c do not communicate with each other. Accordingly, a portion of the compressed air compressed up to the intermediate compression stage 19a flows to the vane ring air flow path 65 via the extraction line 61, as the extraction air. The extraction air flowing through the vane ring air flow path 65 exchanges heat with the vane ring 44 to cool the vane ring 44 (S3: first air cooling step). Accordingly, even when the gas turbine output PWx exceeds the first value PW1 and the temperature of the combustion gas increases at an inlet of the combustion gas flow path 41p, it is possible to prevent the inner diameter of the ring 44 from increasing due to thermal expansion, and as a result, it is possible to prevent the inner diameter of the turbine casing 41 from increasing.

The extraction air which has passed through the vane ring air flow path 65 is introduced to the plurality of vanes 47 configuring the fourth stage vane row 46a via the component introduction line 66. Similarly to the above-described third air cooling step (S1), the extraction air flows into the disk cavity 32c between the vane 47 and the rotor shaft 32 through the vane air flow path 47p formed in the vane 47, and thereafter, flows to the combustion gas flow path 41p via the portion between the inner shroud 49i of the vane 47 configuring the fourth stage vane row 46a and the platform 36 of the blade 34 configuring the three stage blade row 33 (S4: second air cooling step). Accordingly, the plurality of vanes 47 configuring the fourth stage vane row 46a is cooled by the extraction air. In addition, the portion between the inner shroud 49i of the vane 47 configuring the fourth stage vane row 46a and the platform 36 of the blade 34 configuring the three stage blade row 33 is sealed by the extraction air. In addition, for example, a pressure of the extraction air which is the compressed air compressed up to the intermediate compression stage 19a is 4 kPa. Moreover, a pressure between the third stage blade row 33 and the fourth stage vane row 46a in the combustion gas flow path 41p is 2 kPa. That is, a pressure of a location to which the extraction air flows out is lower than the pressure of the extraction air which is the compressed air compressed up to the intermediate compression stage 19a.

Next, the component temperature control unit 102 determines whether or not the gas turbine output PWx is larger than 0 and is less than a predetermined second value PW2 (S5). If the gas turbine output PWx is not less than the second value PW2, the component temperature control unit 102 causes the switcher 75 to maintain the steady state. That is, the component temperature control unit 102 continues the first air cooling step (S3) and the second air cooling step (S4). Meanwhile, if the gas turbine output. PWx is larger than 0 and is less than the second value PW2, the component temperature control unit 102 outputs a bypass state command to the switcher 75, and as shown in FIG. 5, sets to the switcher 75 to the bypass state. If the three-way valve which is the switcher 75 is in the bypass state, as described above, the first opening 75a and the third opening 75c communicate with each other, and the first opening 75a and the second opening 75b do not communicate with each other. Accordingly, a portion of the compressed air compressed up to the intermediate compression stage 19a flows, as extraction air, to the vane air flow path 47p of the plurality of vanes 47 configuring the fourth stage vane row 46a via the extraction line 61, the switcher 75, the bypass line 71, and the component introduction line 66 (S6: third air cooling step). Moreover, the second value PW2 is smaller than the first value PW1. In this way, the reason why the second value PW2 smaller than the first value PW1 is used as a threshold value for switching the switcher 75 from the steady state to the bypass state is to prevent the switcher 75 from hunting.

Next, the component temperature control unit 102 whether or not the gas turbine output PWx is larger than 0 and is less than the second value PW2, exceeds the first value PW1, or is 0 (S7). In a case where the gas turbine output PWx is larger than 0 and is less than the second value PW2, the component temperature control unit 102 causes the switcher 75 to maintain the bypass state. That is, the component temperature control unit 102 continues the third air cooling step (S6). Meanwhile, in a case where the gas turbine output PWx exceeds the first value PW1, the component temperature control unit 102 outputs the steady state command to the switcher 75, sets the switcher 75 to the steady state as shown in FIG. 5, and thus, the first air cooling step (S3) and the second air cooling step (S4) are performed. In addition, in a case where the gas turbine output. PWx is 0, the component temperature control unit 102 ends the control of the switcher 75. Moreover, the switcher 75 maintains the bypass state even after by the component temperature control unit 102 ends the control of the switcher 75. Accordingly, before the start of the gas turbine 1, as described above, the switcher 75 is in the bypass state.

Hereinbefore, in the present embodiment, while the combustion gas G flows through the combustion gas flow path 41p and the gas turbine output PWx exceeds the first value PW1, the extraction air is introduced to the vane ring 44 which is the first component via the extraction line 61, and thus, the vane ring 44 can be cooled. Accordingly, even when the combustion gas G flows through the combustion gas flow path 41p and the gas turbine output PWx exceeds the first value PW1, in the present embodiment, it is possible to prevent the inner diameter of the turbine casing 41 from increasing due to the thermal expansion. Therefore, in the present embodiment, it is possible to suppress the change of the inner diameter of the turbine casing 41 in a state where the combustion gas G flows through the combustion gas flow path 41p and the gas turbine output PWx exceeds the first value PW1 and a state where the combustion gas G does not flow to the combustion gas flow path 41p.

Accordingly, in the present embodiment, it is possible to suppress the change of the tip clearance CC, and as a result, it is possible to decrease the steady clearance while securing the tip clearance CC in the case where the gas turbine 1 hot-starts.

Moreover, in the present embodiment, the compressed air having a high temperature and a high pressure discharged from the compressor 10 via the final compression stage 19 of the compressor 10 does not flow to the vane ring 44 which is the first component, and the compressed air from the intermediate compression stage 19a of the compressor 10 flows to the vane ring 44 which is the first component, as the extraction air. Therefore, in the present embodiment, the compressed air from the intermediate compression stage 19a of the compressor 10 can be used as it is for cooling the vane ring 44 without being cooled by a cooler.

In addition, in the present embodiment, the low-pressure component (second component) is the vanes 47 configuring the fourth stage vane row 46a disposed on the axially downstream side Dad from the first air flow path of the first component. That is, in the present embodiment, the low-pressure component (second component) is the vanes 47 disposed under a pressure environment lower than the pressure of the compressed air at the outlet of the intermediate compression stage 19a. Therefore, in the present embodiment, even when the compressed air from the compressor 10 is not boosted by a booster, the extraction air which has passed through the vane ring 44 which is the first component flows to the vane 47 which is the low-pressure component, and thus, it is possible to cool the vane 47.

Accordingly, in the present embodiment, the first component configuring a portion of the turbine casing 41 is cooled to decrease the steady clearance, the low-pressure component which is the second component different from the first component is cooled, and thus, it is possible to decrease an equipment cost. Moreover, in the present embodiment, the first component and the low-pressure component are cooled by the compressed air from the intermediate compression stage 19a of the compressor 10, and thus, for example, the compressed air Acom having a high temperature and a high pressure discharged from the compressor 10 via the final compression stage 19 of the compressor 10 can be effectively used as air for combustion.

Moreover, in the present embodiment, the gas turbine output PWx is used as a parameter of the threshold value for switching the state of the switcher 75. However, any parameter may be used as long as it is a parameter having correlation with the gas turbine output. Specifically, the flow rate of the fuel supplied to the combustor 20, the temperature of the combustion gas G at the inlet of the combustion gas flow path 41p, or the like may be used as the parameter.

Second Embodiment

A second embodiment of the gas turbine according to the present invention will be described with reference to FIGS. 6 and 7.

In the gas turbine 1 of the first embodiment, the second end of the extraction line 61 is connected to the axially downstream end Ed of the vane ring air flow path 65, and the first end of the component introduction line 66 is connected to the axially upstream end Eu of the vane ring air flow path 65. Accordingly, in the gas turbine 1 of the first embodiment, the extraction air flows through the vane ring air flow path 65 from the axially downstream side Dad to the axially upstream side Dau.

Figure 6:
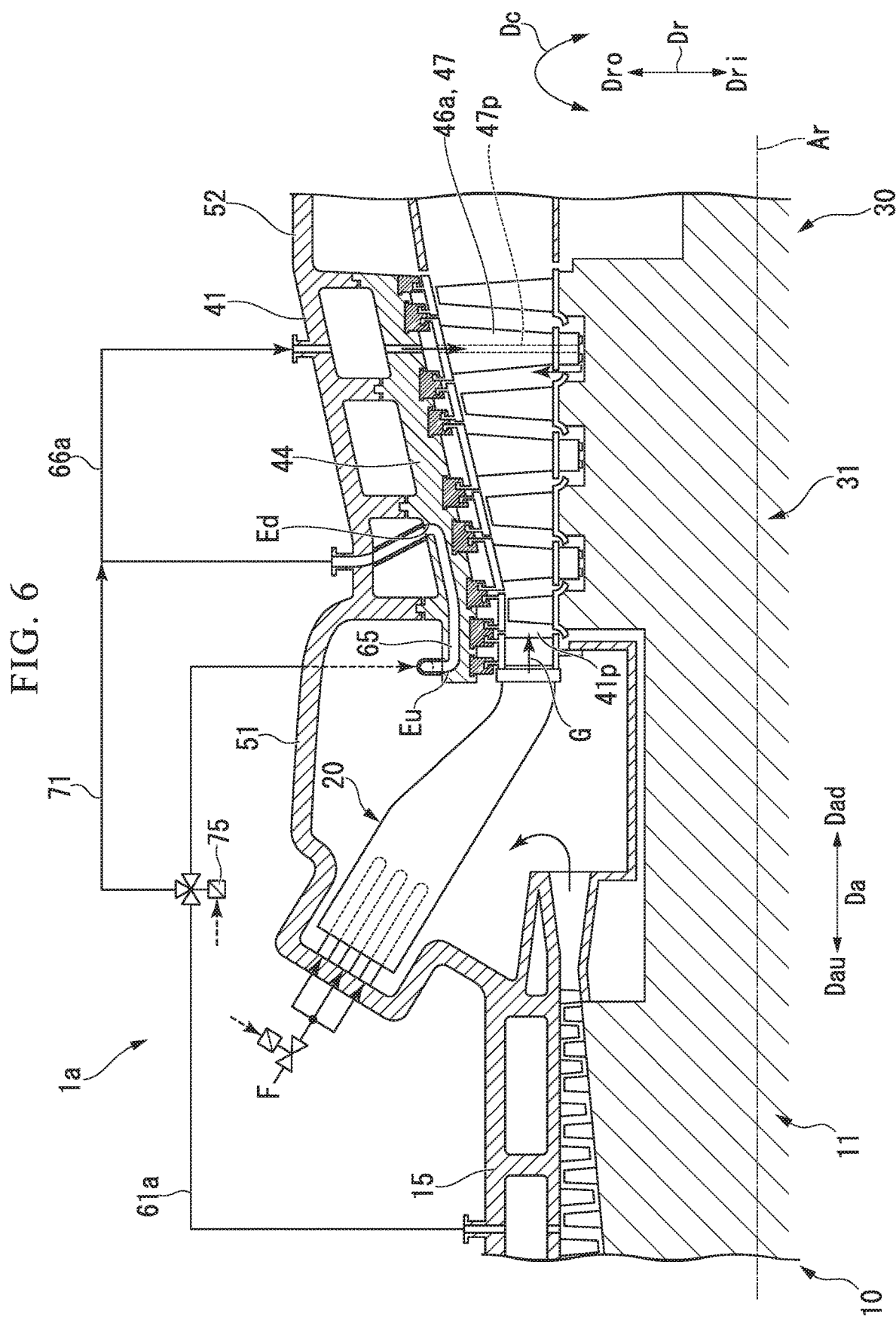
FIG. 6 is a main cross-sectional view of a gas turbine in a second embodiment according to the present invention.
Figure 7:
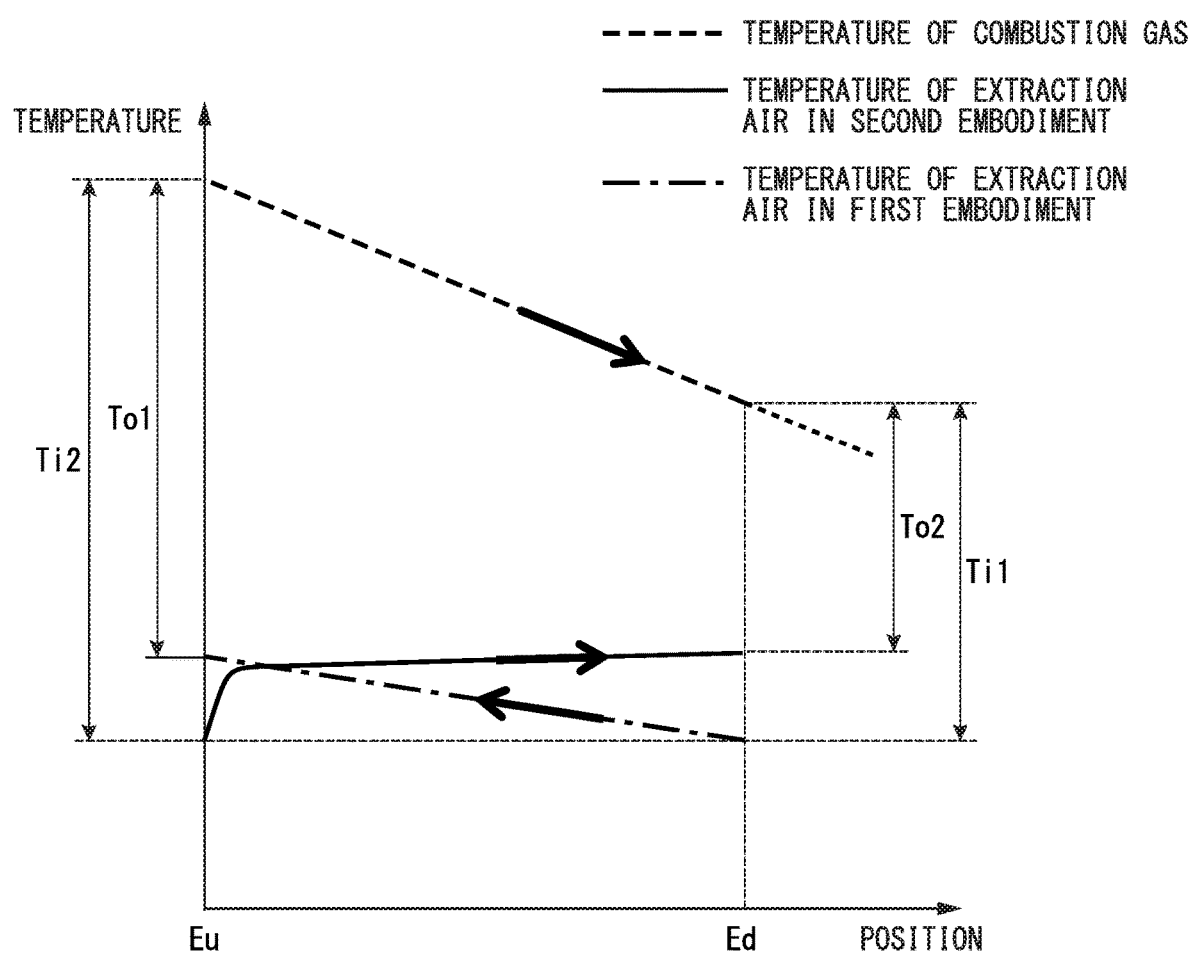
FIG. 7 is an explanatory graph showing temperature changes of a combustion gas and an extraction air in the second embodiment according to the present invention.

Meanwhile, as shown in FIG. 6, in a gas turbine 1a of the present embodiment, a second end of an extraction line 61a is connected to the axially upstream end Eu of the vane ring air flow path 65, and a first end of a component introduction line 66a is connected to the axially downstream end Ed of the vane ring air flow path 65. Accordingly, in the gas turbine 1a of the present embodiment, the extraction air flows through the vane ring air flow path 65 from the axially downstream side Dad to the axially upstream side Dau. In addition, the gas turbine 1a of the present embodiment is different from the gas turbine 1 of the first embodiment in the above-described matters, and other matters of the gas turbine 1a of the present embodiment are the same as those of the gas turbine 1 of the first embodiment.

In the present embodiment, the second end of the extraction line 61a is connected to the axially upstream end Eu of the vane ring air flow path 65, and thus, it is possible to decrease a distance between the first end and the second end of the extraction line 61a in the axial direction Da. Moreover, in the present embodiment, the first end of the component introduction line 66a is connected to the axially downstream end Ed of the vane ring air flow path 65, and thus, it is possible to decrease a distance between the first and the second end of the component introduction line 66a in the axial direction Da. Accordingly, in the present embodiment, it is possible to decrease the distance of each of the lines 61a and 66a, and thus, an equipment cost can be somewhat decreased compared with the first embodiment.

Here, the temperature changes of the combustion gas G in the combustion gas flow path 41p and the temperature changes of the extraction air in the vane ring air flow path 65 will be described with reference to FIG. 7. Moreover, a horizontal axis indicates an axial position based on the inlet of the combustion gas flow path 41p and a vertical axis indicates the temperature.

The temperature of the combustion gas G sequentially decreases as the combustion gas G flows through the combustion gas flow path 41p to the axially downstream side Dad. Accordingly, similarly to the temperature of the combustion gas G the temperature of the vane ring 44 configuring a portion of the turbine casing 41 sequentially decreases as the combustion gas G flows through the combustion gas flow path 41p to the axially downstream side Dad.

As described above, in the gas turbine 1 of the first embodiment, the extraction air flows through the vane ring air flow path 65 from the axially downstream side Dad to the axially upstream side Dau. That is, in the gas turbine 1 of the first embodiment, the flow of the extraction air is a countercurrent with respect to the flow of the combustion gas G. In the first embodiment, the temperature of the extraction air gradually increases due to the heat exchange between the extraction air and the vane ring 44 as the extraction air flows through the vane ring air flow path 65 from the axially downstream side. Dad to the axially upstream side Dau. The amount of the temperature changes of the combustion gas G and the vane ring 44 according to the position change is larger than the temperature change of the extraction air of the first embodiment according to the position change. Accordingly, a temperature difference To1 between the temperature of the extraction air at the position of the axially upstream end Eu of the vane ring air flow path 65 and the temperatures of the combustion gas and the vane ring 44 at the same position in the axial direction Da is larger than a temperature difference Ti1 between the temperature of the extraction air at the position of the axially downstream end Ed of the vane ring air flow path 65 and the temperatures of the combustion gas and the vane ring 44 at the same position in the axial direction Da. Accordingly, in the first embodiment, an amount of the heat exchange between the extraction air and the vane ring 44 increases as the extraction air flows through the vane ring air flow path 65.

As described above, in the gas turbine 1a of the second embodiment, the extraction air flows through the vane ring air flow path 65 from the axially upstream side Dau to the axially downstream side Dad. In the present embodiment, the temperature of the extraction air gradually increases due to the heat exchange between the extraction air and the vane ring 44 as the extraction air flows through the vane ring air flow path 65 from the axially upstream side Dau to the axially downstream side Dad. Meanwhile, as described above, the combustion gas flows to the axially downstream side Dad, and thus, the temperature of the combustion gas G gradually decreases as the combustion gas G flow to the axially downstream side Dad. Accordingly, a temperature difference To2 between the temperature of the extraction air at the position of the axially downstream end Ed of the vane ring air flow path 65 and the temperatures of the combustion gas and the vane ring 44 at the same position in the axial direction Da is smaller than a temperature difference Ti2 between the temperature of the extraction air at the position of the axially upstream end Eu of the vane ring air flow path 65 and the temperatures of the combustion gas and the vane ring 44 at the same position in the axial direction Da. Accordingly, in the second embodiment, the amount of the heat exchange between the extraction air and the vane ring 44 decreases as the extraction air flows through the vane ring air flow path 65. In addition, the difference To2 of the second embodiment between the temperature of the extraction air at the position of the axially downstream end Ed of the vane ring air flow path 65 and the temperatures of the combustion gas and the vane ring 44 at the same position in the axial direction Da is the minimum among the above-described temperature differences(Ti1, To1, and Ti2).

In addition, in the second embodiment, the temperature of each of the combustion gas G and the vane ring 44 is highest and the temperature of the extraction air is low at the position at which the extraction air flows into the vane ring air flow path 65, and thus, the temperature flowing into the vane ring air flow path 65 increases sharply. Thereafter, the temperature of the extraction air gradually increases as the extraction air flows to the axially downstream side Dad. However, a temperature increase rate of the extraction air after a sharp temperature increase immediately after flowing into the vane ring air flow path 65 is lower than a temperature increase rate of the extraction air flowing through the vane ring air flow path 65 in the first embodiment. Accordingly, in the second embodiment, a difference between the temperature of the extraction air at each position of a wide region including not only the axially downstream end Ed of the vane ring air flow path 65 but also the axially downstream end Ed thereof and the temperatures of the combustion gas and the vane ring 44 at the same position in the axial direction Da decreases.

Accordingly, the temperature difference between the temperature of the extraction air at each position of the entire region of the vane ring air flow path 65 in the axial direction Da and the temperature of the vane ring 44 in the first embodiment is larger than the temperature difference between the temperature of the extraction air at each position of the region including the axially downstream end Ed of the vane ring air flow path 65 and the temperature of the vane ring 44 in the second embodiment. Accordingly, the amount of the heat exchange between the extraction air and the vane ring 44 over the entire region of the vane ring air flow path 65 in the axial direction Da in the first embodiment can be higher than that in the region including the axially downstream end Ed of the vane ring air flow path 65 in the second embodiment. Therefore, in the first embodiment, it is possible to effectively cool the vane ring 44 over the entire region of the vane ring air flow path 65 in the axial direction Da.

Hereinbefore, from the viewpoint of decreasing the equipment cost, it is preferable to adopt the aspect of the second embodiment. Meanwhile, from the viewpoint of effectively cooling the vane ring 44, it is preferable to adopt the aspect of the first embodiment. Accordingly, from the two viewpoints of decreasing the equipment cost and of effectively cooling the vane ring 44, it is preferable to determine which embodiment to adopt.

Third Embodiment

A third embodiment of the gas turbine according to the present invention will be described with reference to FIG. 8.

In the gas turbine 1 of the first embodiment, the position of the axially upstream end Eu of the vane ring air flow path 65 in the axial direction Da is the position at which the first stage vane row 46 is provided in the axial direction Da. In addition, the position of the axially downstream end Ed of the vane ring air flow path 65 in the axial direction Da is the position between the second stage vane row 46 and the second blade row 33 in the axial direction Da.

Figure 8:
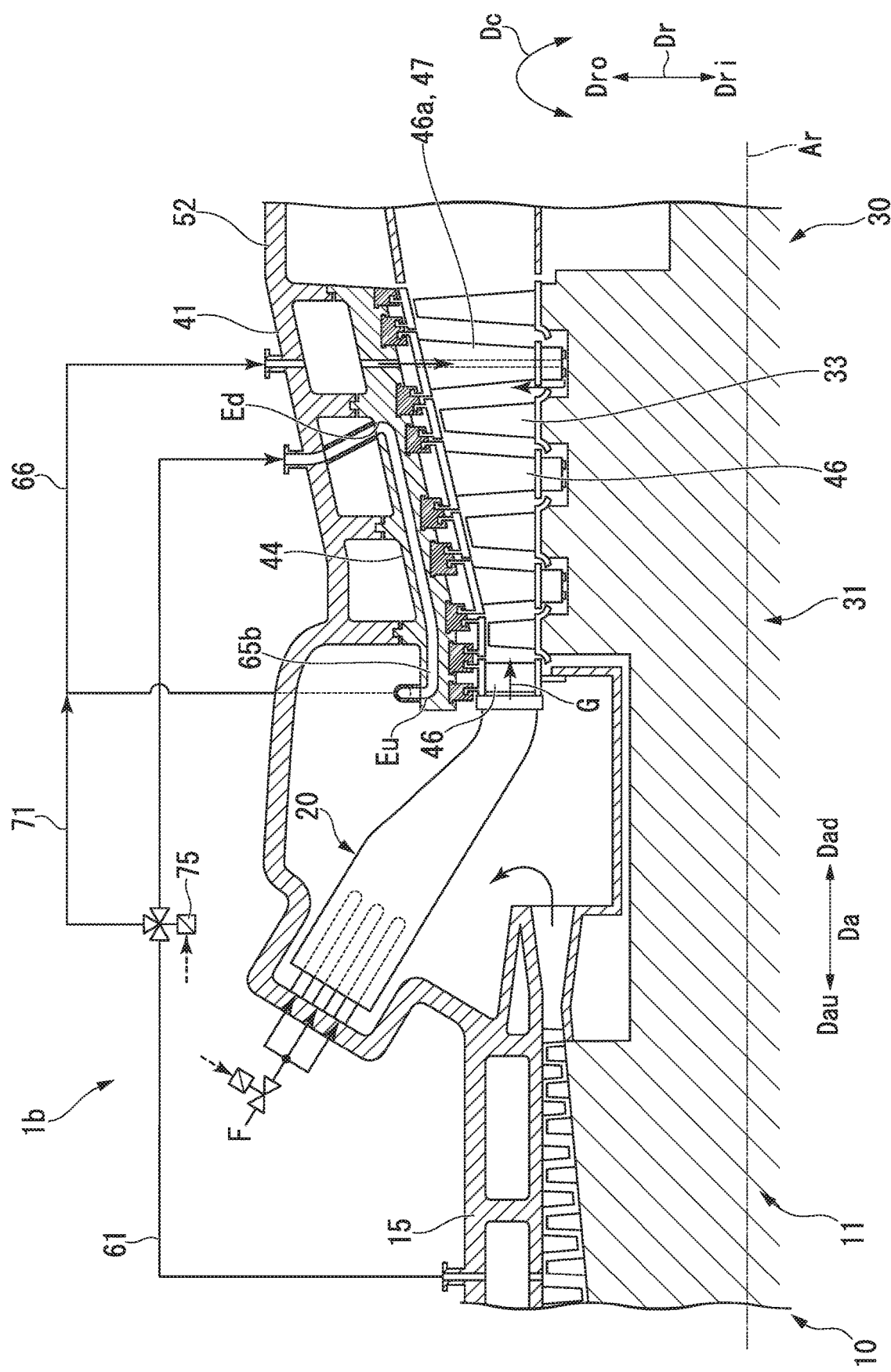
FIG. 8 is a main cross-sectional view of a gas turbine in a third embodiment according to the present invention.

As shown in FIG. 8, in a gas turbine 1b of the present embodiment, similarly to the first embodiment, the position of the axially upstream end Eu of a vane ring air flow path 65b in the axial direction Da is the position at which the first stage vane row 46 is provided in the axial direction Da. Meanwhile, the position of the axially downstream end Ed of the vane ring air flow path 65b in the axial direction Da is the position between the third stage vane row 46 and the third blade row 33 in the axial direction Da. That is, in the gas turbine 1b of the present embodiment, the position of the axially downstream end Ed of the vane ring air flow path 65b in the axial direction Da is shifted to the axially downstream side Dad from the position of the axially downstream end Ed of the vane ring air flow path 65 in the axial direction Da in the first embodiment. Accordingly, the length of the vane ring air flow path 65b in the axial direction Da in the present embodiment is longer than the length of the vane ring air flow path 65 in the axial direction Da in the first embodiment. In addition, the gas turbine 1b of the present embodiment is different from the gas turbine 1 of the first embodiment in the above-described matters, and other matters of the gas turbine 1b of the present embodiment are the same as those of the gas turbine 1 of the first embodiment.

As described above, in the present embodiment, the position of the axially downstream end Ed of the vane ring air flow path 65b in the axial direction Da is shifted to the axially downstream side Dad from the position of the axially downstream end Ed of the vane ring air flow path 65 in the axial direction Da in the first embodiment, and thus, it is possible to cool the axially downstream side Dad of the vane ring 44 more than the first embodiment.

In addition, similarly to the second embodiment, in the present embodiment, the second end of the extraction line 61 may be connected to the axially upstream end Eu of the vane ring air flow path 65 and the first end of the component introduction line 66 is connected to the axially downstream end Ed of the vane ring air flow path 65.

In addition, in the present embodiment and other embodiments, the vane ring may be configured with a plurality of components. In this case, the vane ring air flow path may be formed over the plurality of components configuring the vane ring. Meanwhile, in a case where the vane ring air flow path is formed over the plurality of components configuring the vane ring, it is necessary to provide a seal structure at a position between the plurality of components configuring the vane ring. Accordingly, from the viewpoint of the equipment cost or the like, it is preferable that the vane ring is an integrally formed product in the axial direction Da in the region in which the vane ring air flow path is formed. In addition, even though the vane ring is the integrally formed product in the axial direction Da, from the viewpoint of disassembly or the like of the gas turbine, it is preferable that the integrally formed product can be divided in the circumferential direction Dc.

Fourth Embodiment

A fourth embodiment of the gas turbine according to the present invention will be described with reference to FIGS. 9 to 11.

Figure 9:
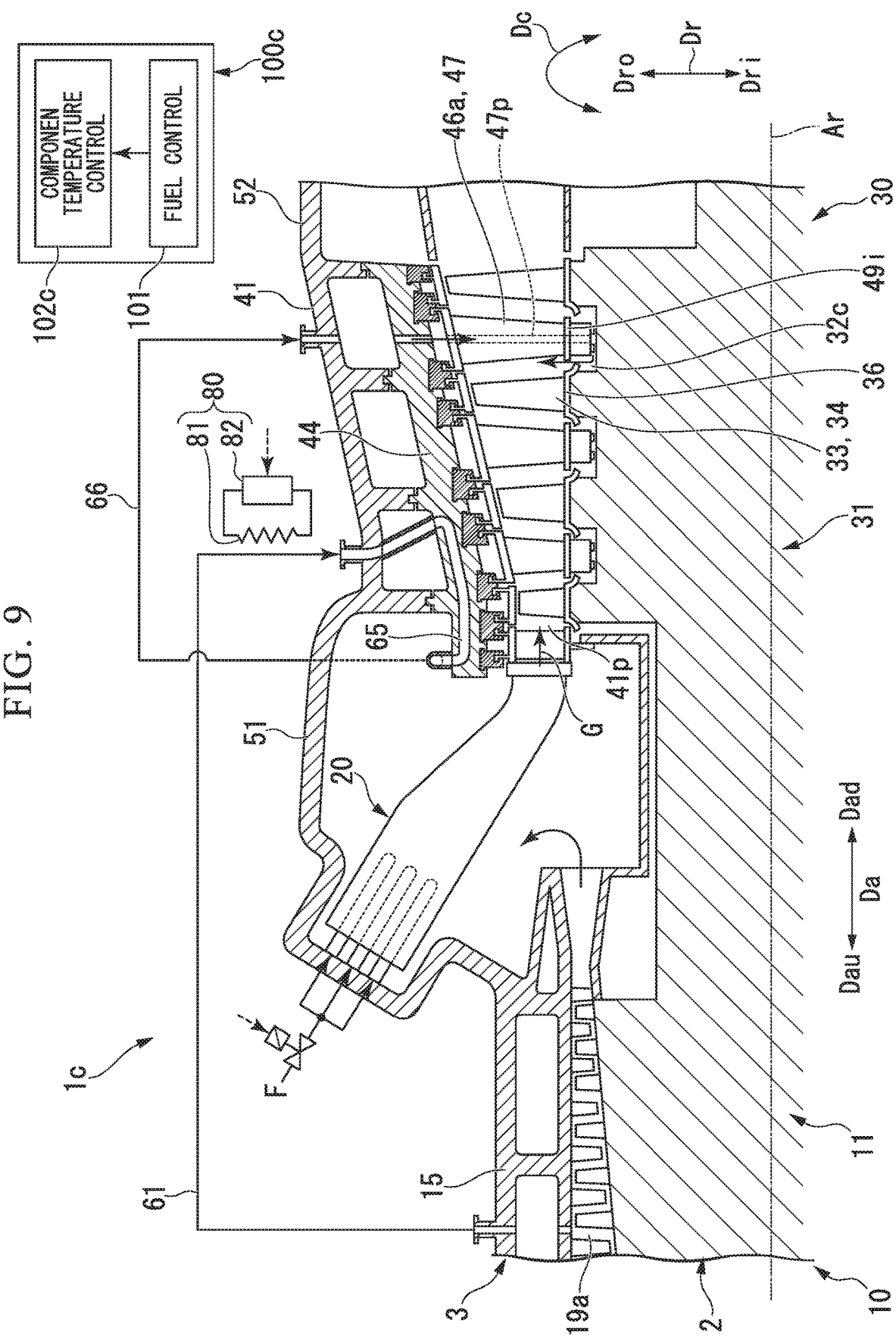
FIG. 9 is a main cross-sectional view of a gas turbine in a fourth embodiment according to the present invention.
Figure 10:
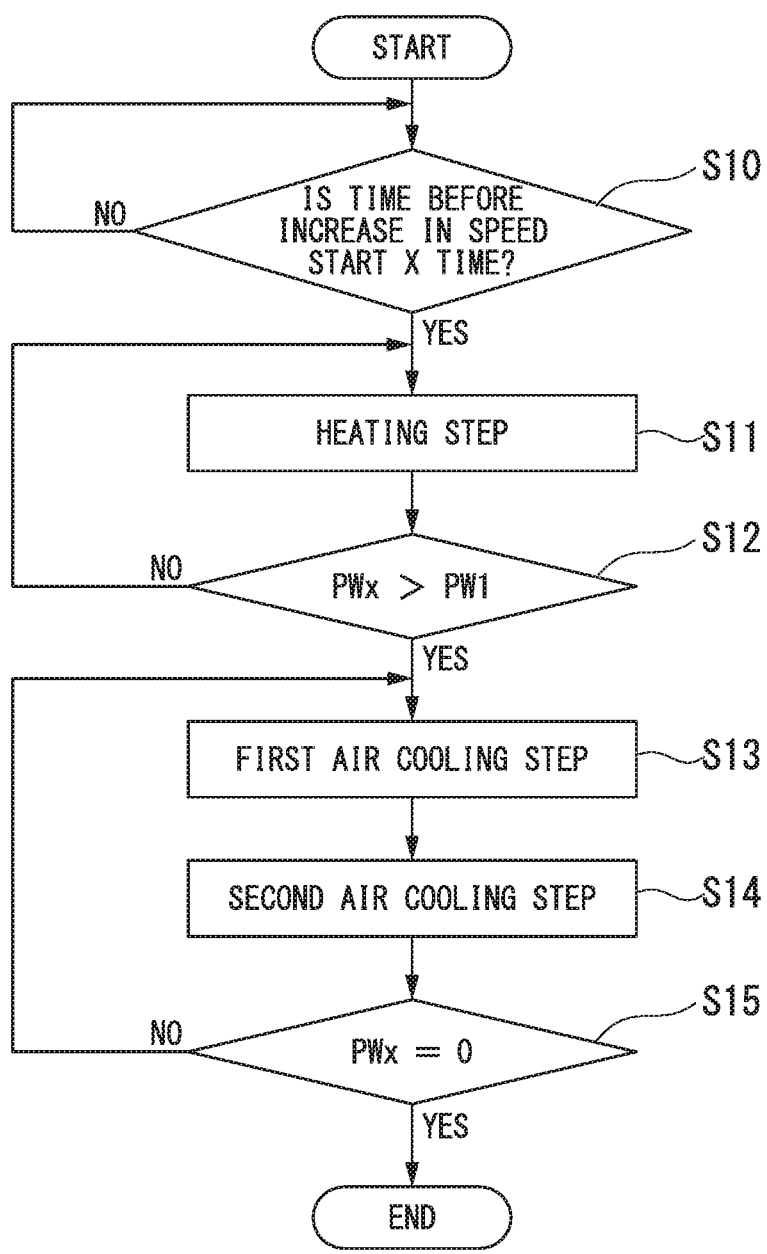
FIG. 10 is a flowchart showing a procedure of a component-temperature adjustment method in the fourth embodiment according to the present invention.

As shown in FIG. 9, similarly to the first embodiment, a gas turbine 1c of the present embodiment includes the extraction line 61 and the component introduction line 66. However, the gas turbine 1c of the present embodiment does not include the bypass line 71 and the switcher 75 of the first embodiment. Moreover, the gas turbine 1c of the present embodiment includes a heater (heating device) 80 which is provided in the extraction line 61 and heats the extraction line 61.

For example, the heater 80 includes an electric heater 81 which is provided along the extraction line 61 and a heater drive circuit 82 which drives the electric heater 81. The heater 80 is controlled by a command from a component temperature control unit (cooling controller, heating controller) 102c of a controller 100c. The command from the component temperature control unit 102c is input the heater drive circuit 82.

According to a flowchart shown in FIG. 10, a component-temperature adjustment method of the gas turbine 1c in the present embodiment will be described.

The component temperature control unit 102c determines whether or not a time before the increase in the speed of the turbine rotor 31 in the start process of the turbine 30 is X time (S10). The component temperature control unit 102c performs this determination according to information from the outside or the fuel control unit 101. If the component temperature control unit 102c determines that the time before the increase in the speed of the turbine rotor 31 starts is the X time, as shown in FIG. 11, the component temperature control unit 102c outputs a heating state command to the heater 80 to set the heater 80 to a heating state. That is, the component temperature control unit 102c causes the heater 80 to heat the extraction line 61. In general, even when the fuel supply to the combustor 20 stops, the gas turbine rotor 2 is rotated at a low speed in order to decrease deformation of the gas turbine rotor 2. Accordingly, even in a state where the fuel supply to the combustor 20 stops, gas flows through the gas turbine casing 3 similarly to when the fuel F is supplied to the combustor 20. Meanwhile, the speed of the gas flow is significantly smaller than that when the fuel is supplied to the combustor 20. Accordingly, even before the turbine 30 starts, there is an air flow flowing toward the vane ring air flow path 65 in the extraction line 61. Therefore, if the extraction line 61 is heated by the heater 80 even before the turbine 30 starts, the air is heated in the extraction line 61, and thereafter, the air flows into the vane ring air flow path 65 to heat the vane ring 44 (S11: heating step).

If the increase in the speed of the turbine rotor 31 starts, the air is compressed sequentially in the compression stages 19 of the compressor 10. Accordingly, a portion of the compressed air compressed up to the intermediate compression stage 19a flows into the vane ring air flow path 65 of the vane ring 44, as the extraction air, via the extraction line 61. A portion of the extraction line 61 is heated by the heater 80 at this time as well, and thus, the vane ring 44 is heated. Similarly to the first embodiment, the extraction air which has passed through the vane ring air flow path 65 is introduced to the plurality of vanes 47 configuring the fourth stage vane row 46a via the component introduction line 66. The extraction air flows into the disk cavity 32c between the vane 47 and the rotor shaft 32 through the vane air flow path 47p formed in the vane 47, and thereafter, flows to the combustion gas flow path 41p via a portion between the inner shroud 49i of the vane 47 configuring the fourth stage vane row 46a and the platform 36 of the blade 34 configuring the three stage blade row 33. Accordingly, the portion between the inner shroud 49i of the vane 47 configuring the fourth stage vane row 46a and the platform 36 of the blade 34 configuring the three stage blade row 33 is sealed by the extraction air. Meanwhile, the extraction air is heated by the heater 80, and thus, unlike the first embodiment, the extraction air does not function as the air for cooling the vane 47 configuring the fourth stage vane row 46a.

Figure 11:
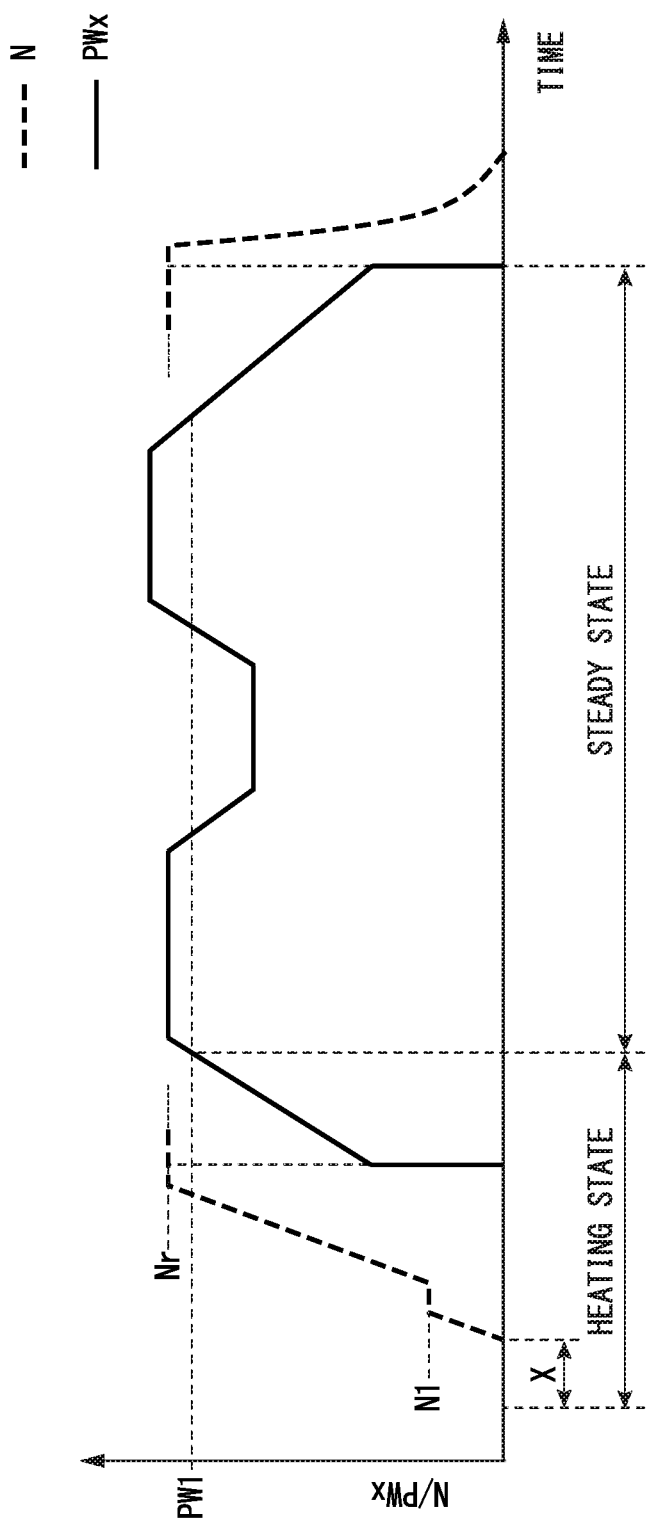
FIG. 11 is an explanatory graph showing a relationship between changes in an output and a rotation speed of the gas turbine over time and a state of a heater in the fourth embodiment according to the present invention.

As shown in FIG. 11, if the rotation speed N of the gas turbine rotor 2 becomes the rated rotation speed Nr, the generator 9 connected to the gas turbine rotor 2 is connected to an external electric power system. As a result, the gas turbine output PWx, that is, power from the generator 9 starts to be supplied to the electric power system.

The component temperature control unit 102c determines whether or not the gas turbine output PWx exceeds the predetermined first value PW1 (S12). If the gas turbine output PWx does not exceed the predetermined first value PW1, the component temperature control unit 102c causes the heater 80 to maintain the heating state. That is, the component temperature control unit 102c continues the heating step (S10). Accordingly, in the start process of the gas turbine 1c, compared to a case where the extraction air is not heated until the gas turbine output PWx exceeds the first value PW1, the inner diameter of the vane ring 44 increases. Meanwhile, if the gas turbine output PWx exceeds the first value PW1, the component temperature control unit 102c outputs the steady state command to the heater 80 and sets the heater 80 to a non-heating state, as shown in FIG. 11. If the heater 80 is in the steady state, the extraction air which is not heated by the heater 80 flows through the vane ring air flow path 65. The extraction air flowing through the vane ring air flow path 65 exchanges heat with the vane ring 44 to cool the vane ring 44 (S13: first air cooling step).

Accordingly, even when the gas turbine output PWx exceeds the first value PW1 and the temperature of the combustion gas G increases at the inlet of the combustion gas flow path 41p, it is possible to prevent the inner diameter of the vane ring 44 from increasing due to thermal expansion.

The extraction air which has passed through the vane ring air flow path 65 is introduced to the plurality of vanes 47 configuring the fourth stage vane row 46a via the component introduction line 66. The extraction air flows into the disk cavity 32c between the vane 47 and the rotor shaft 32 through the vane air flow path 47p formed in the vane 47, and thereafter, flows to the combustion gas flow path 41p via the portion between the inner shroud 49i of the vane 47 configuring the fourth stage vane row 46a and the platform 36 of the blade 34 configuring the three stage blade row 33 (S14: second air cooling step). Accordingly, the plurality of vanes 47 configuring the fourth stage vane row 46a is cooled by the extraction air. In addition, the portion between the inner shroud 49i of the vane 47 configuring the fourth stage vane row 46a and the platform 36 of the blade 34 configuring the three stage blade row 33 is sealed by the extraction air.

Next, the component temperature control unit 102c determines whether or not the gas turbine output PWx is 0 (S15). If the gas turbine output PWx is not 0, the component temperature control unit 102c causes the heater 80 to maintain the steady state. That is, the component temperature control unit 102c continues the first air cooling step (S13) and the second air cooling step (S14). Meanwhile, if the gas turbine output PWx is 0, the component temperature control unit 102c ends the control of the switcher 75 heater 80.

Hereinbefore, similarly to the first embodiment, in the present embodiment, if the combustion gas G flows through the combustion gas flow path 41p and the gas turbine output PWx exceeds the first value PW1, it is possible to cool the vane ring 44 which is the first component. Therefore, even when the combustion gas G flows through the combustion gas flow path 41p and the gas turbine output PWx exceeds the first value PW1, in the present embodiment, it is possible to prevent the inner diameter of the turbine casing 41 from decreasing due to the thermal expansion. Therefore, in the present embodiment, it is possible to decrease the changes of the inner diameter of the turbine casing 41 between a state where the combustion gas G flows through the combustion gas flow path 41p and the gas turbine output PWx exceeds the first value PW1 and a state before the above-described state.

In addition, in the present embodiment, the vane ring 44 is heated before the turbine rotor 31 starts to be rotated at a high speed and the inner diameter of the vane ring 44 increases, and thus, even in the case where the gas turbine 1c hot-starts, it is possible to prevent the tip clearance CC from being 0 or a significantly small value.

Therefore, in the present embodiment, the steady clearance can be smaller than that in the first embodiment while the tip clearance CC in the case where the gas turbine 1c hot-starts is secured.

In addition, similarly to the first embodiment, in the present embodiment, a cooler for cooling the air compressed by the compressor 10 or a booster for boosting the air is not required, and thus, it is possible to decrease the equipment cost. Moreover, in the present embodiment, the first component and the low-pressure component are cooled by the compressed air from the intermediate compression stage 19a of the compressor 10, and thus, for example, the compressed air having a high temperature and a high pressure discharged from the compressor 10 via the final compression stage 19 of the compressor 10 can be effectively used as air for combustion.

Moreover, in the present embodiment, the heater 80 having the electric heater 81 is used. Meanwhile, any heater may be used as long as it can generate heat, and for example, a heater having steam or exhaust gas from the gas turbine 1c as a heat source may be used. In addition, in the present embodiment, the heater 80 is provided in the extraction line 61. However, the heater 80 may be provided in the vane ring 44 which is the first component.

Moreover, the present embodiment is a modification example of the first embodiment. However, similarly to the present embodiment, the heater may be provided in the second embodiment and the third embodiment.

Fifth Embodiment

Figure 12:
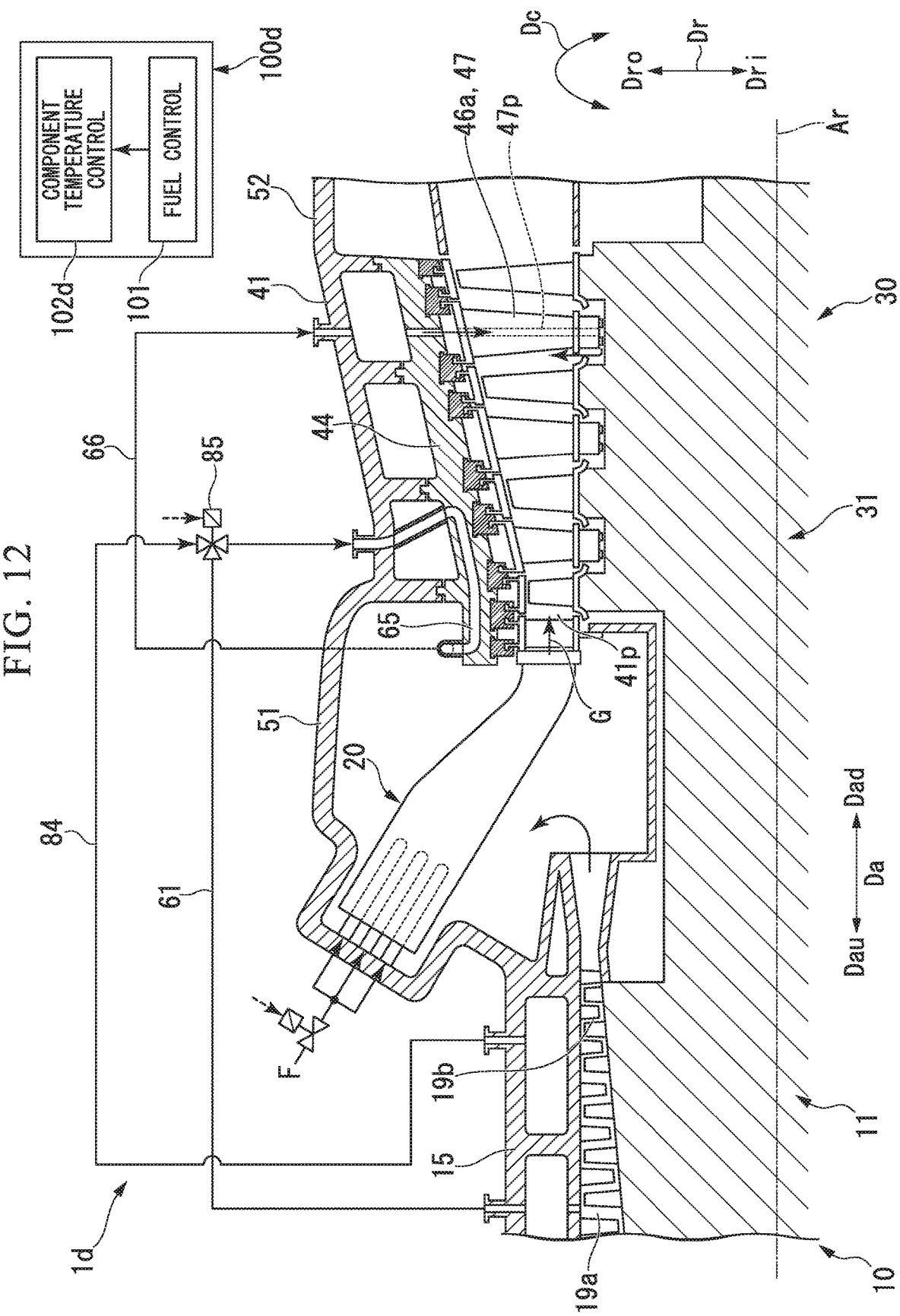
FIG. 12 is a main cross-sectional view of a gas turbine in a fifth embodiment according to the present invention.

A fifth embodiment of the gas turbine according to the present invention will be described with reference to FIG. 12.

Similarly to the first embodiment, a gas turbine 1d of the present embodiment includes the extraction line 61 (hereinafter, referred to as a first extraction line 61) and the component introduction line 66. However, the gas turbine 1d of the present embodiment does not include the bypass line 71 and the switcher 75 of the first embodiment. In addition, the gas turbine 1d of the present embodiment includes a second extraction line (high-temperature air line) 84 and a switcher 85. In the present embodiment, the second extraction line 84 and the switcher 85 configure heating device for heating the vane ring 44.

A first end of the second extraction line 84 is connected to a position of a high-pressure compression stage 19b positioned on the downstream side from a position to which a first end of the first extraction line 61 is connected in the compressor casing 15 or is connected to the intermediate casing 51. Accordingly, a compressed air having a temperature and a pressure higher than those of the compressed air flowing into the first extraction line 61 flows into the second extraction line 84. A second end of the second extraction line 84 is connected to the first extraction line 61. The switcher 85 of the present embodiment is a three-way valve. The switcher 85 is provided in a connection position between the first extraction line 61 and the second extraction line 84. The switcher 85 performs switching between a steady state where a first extraction air which is the compressed air which has flowed into the first extraction line 61 flows into the vane ring air flow path 65 and a heating state where a second extraction air which is the compressed air which has flowed into the second extraction line 84 flows into the vane ring air flow path 65. The switcher 85 is controlled by a command from a component temperature control unit (cooling controller, heating controller) 102d of a controller 100d. In addition, the switcher 85 may not be three-way valve, and for example, can be, configured with a two-way valve.

In the present embodiment, if a heating state command is output from the component temperature control unit 102d to the switcher 85 and the switcher 85 is in the heating state, the second extraction air having a high temperature from the second extraction line 84 flows into the vane ring air flow path 65. Accordingly, if the heating state command is output from the component temperature control unit 102d to the switcher 85, similarly to the fourth embodiment, the heating step of heating the vane ring 44 is performed. In addition, in the present embodiment, if a steady state command is output from the component temperature control unit 102d to the switcher 85 and the switcher 85 is in the steady state, the first extraction air having a low temperature from the first extraction line 61 flows into the vane ring air flow path 65. Accordingly, if the steady state command is output from the component temperature control unit 102d to the switcher 85, similarly to the fourth embodiment, the cooling step of cooling the vane ring 44 is performed.

Similarly to the heater 80 of the fourth embodiment, the switcher 85 of the present embodiment is in the heating state until the gas turbine output PWx exceeds the first value PW1 in the start process of the gas turbine 1d. In addition, similarly to the heater 80 of the fourth embodiment, the switcher 85 of the present embodiment is in the steady state after the gas turbine output PWx exceeds the first value PW1.

Accordingly, similarly to the fourth embodiment, in the present embodiment, the steady clearance can be smaller than that in the first embodiment while the tip clearance CC in the case where the gas turbine 1d hot-starts is secured. Meanwhile, in the present embodiment, even when the switcher 85 is in the heating state from the X time before the increase in the speed of the turbine rotor 31 in the start process of the turbine 30 starts, the second extraction air having a high temperature does not flow through the second extraction line 84 as long as the compressor rotor 11 does not rotate, and thus, the heating step is not performed.

Therefore, in a case where it is desired to perform the heating step from the X time before the increase in the speed of the turbine rotor 31 in the start process of the turbine 30, air from a high-temperature air generation source for generating a high-temperature air may be introduced to the extraction line 61 through the high-temperature air line independently of start and stop operations of the compressor 10.

In addition, the present embodiment is a modification example of the first embodiment. However, similarly to the present embodiment, the second extraction line 84 (high-temperature air line) and the switcher 85 may be provided in the second embodiment and the third embodiment.

Sixth Embodiment

Figure 13:
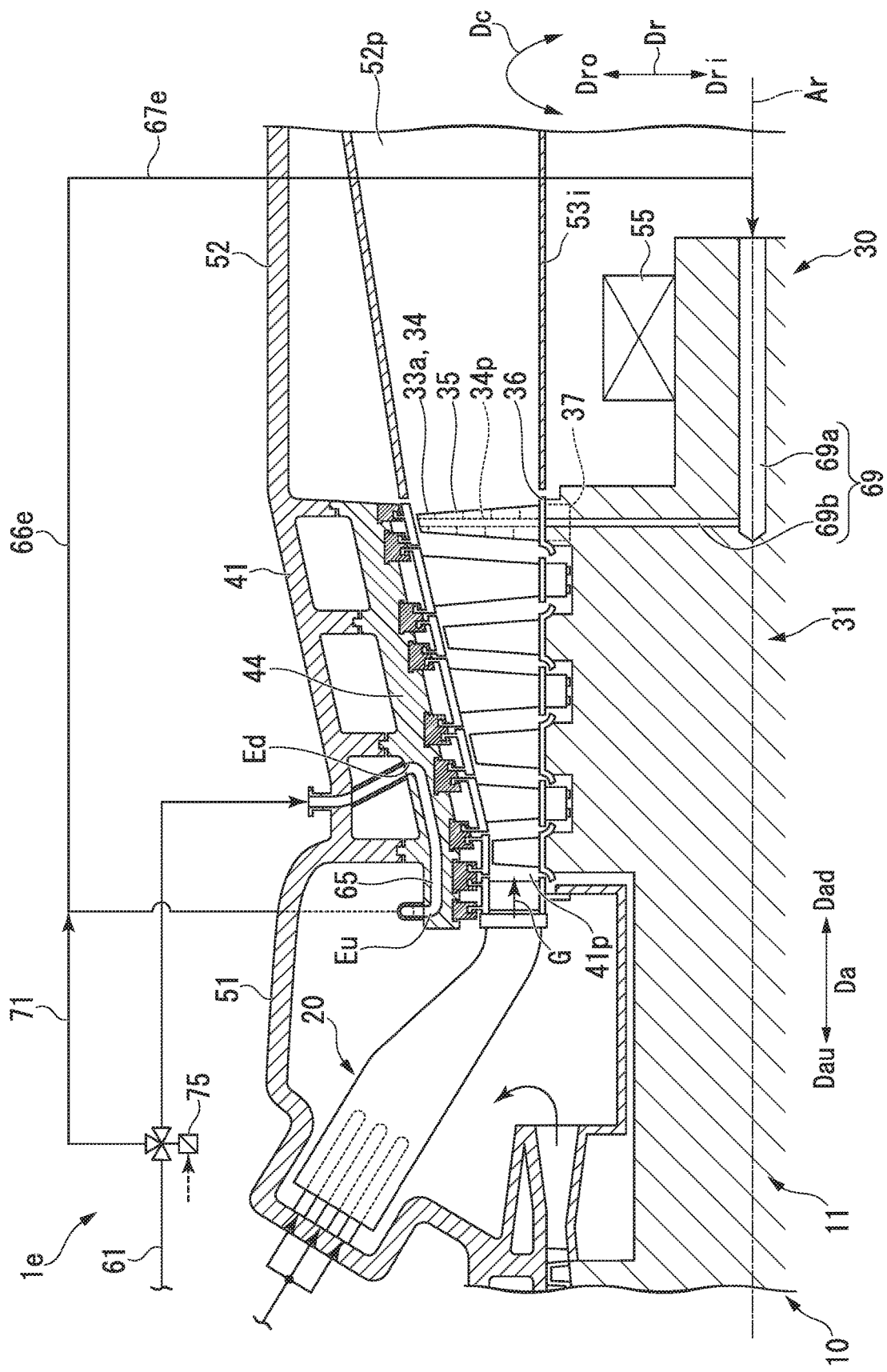
FIG. 13 is a main cross-sectional view of a gas turbine in a sixth embodiment according to the present invention.

A sixth embodiment of the gas turbine according to the present invention will be described with reference to FIG. 13.

In the first embodiment, the first end of the component introduction line 66 is connected to the axially upstream end Eu of the vane ring air flow path 65 and the second end thereof is connected to the plurality of vanes 47 configuring the fourth stage vane row 46a.

Meanwhile, in a gas turbine 1e of the present embodiment, similarly to the first embodiment, a first end of a component introduction line 66e is connected to the axially upstream end Eu of the vane ring air flow path 65. However, a second end thereof is connected to the plurality of blades 34 configuring the fourth stage blade row 33a. That is, in the present embodiment, the plurality of blades 34 configuring the fourth stage blade row 33a form the low-pressure component.

A blade air flow path (second air flow path) 34p is formed in the blade 34 configuring the fourth stage blade row 33a. The blade air flow path 34p is open to a surface of the radially inner side Dri of the blade root, and extends from the surface to the blade body 35 via the blade root 37 and the platform 36. Accordingly, air which has flowed into the blade air flow path 34p flows to the combustion gas flow path 41p. The blade air flow path 34p in the blade body 35 is divided into a plurality of paths, and the divided paths are open to the surface of the blade body 35. A second end of the component introduction line 66e is connected to an opening on the blade root 37 side in the blade air flow path 34p. A flow path of the component introduction line 66e in the present embodiment includes a flow path in a reuse pipe 67e and a rotor air flow path (third air flow path) 69. The reuse pipe 67e is connected to the axially upstream end Eu of the vane ring air flow path 65 and is connected to the axially downstream end of the turbine rotor 31. The rotor air flow path 69 includes a main flow path 69a which is open to the downstream end of the turbine rotor 31 and extends toward the axially upstream side Dau on the axis Ar and a plurality of division flow paths 69b which are divided from the main flow path 69a and extend to the blade roots 37 of the plurality of blades 34 configuring the fourth stage blade row 33a. The flow path in the reuse pipe 67e communicates with the main flow path 69a of the rotor air flow path 69. In addition, the reuse pipe 67e does not come into contact with the axially downstream end of the rotating turbine rotor 31. Therefore, the reuse pipe 67e and the axially downstream end of the turbine rotor 31 are connected to each other means that air from the reuse pipe 67e can flow into the rotor air flow path 69 of the turbine rotor 31.

In the present embodiment, it is possible to cool the plurality of blades 34 configuring the fourth stage blade row 33a by the extraction air which has flowed into the component introduction line 66e.

In addition, the present embodiment is a modification example of the first embodiment. However, similarly to the present embodiment, the plurality of blades 34 configuring the fourth blade stage row 33a may be the low-pressure component in the second to fifth embodiments.

Seventh Embodiment

A seventh embodiment of the gas turbine according to the present invention will be described with reference to FIG. 14.

In the gas turbine 1 of the first embodiment, the position of the axially upstream end Eu of the vane ring air flow path 65 in the axial direction Da is the position at which the first stage vane row 46 is provided in the axial direction Da. In addition, the position of the axially downstream end Ed of the vane ring air flow path 65 in the axial direction Da is the position between the second stage vane row 46 and the second blade row 33 in the axial direction Da.

Figure 14:
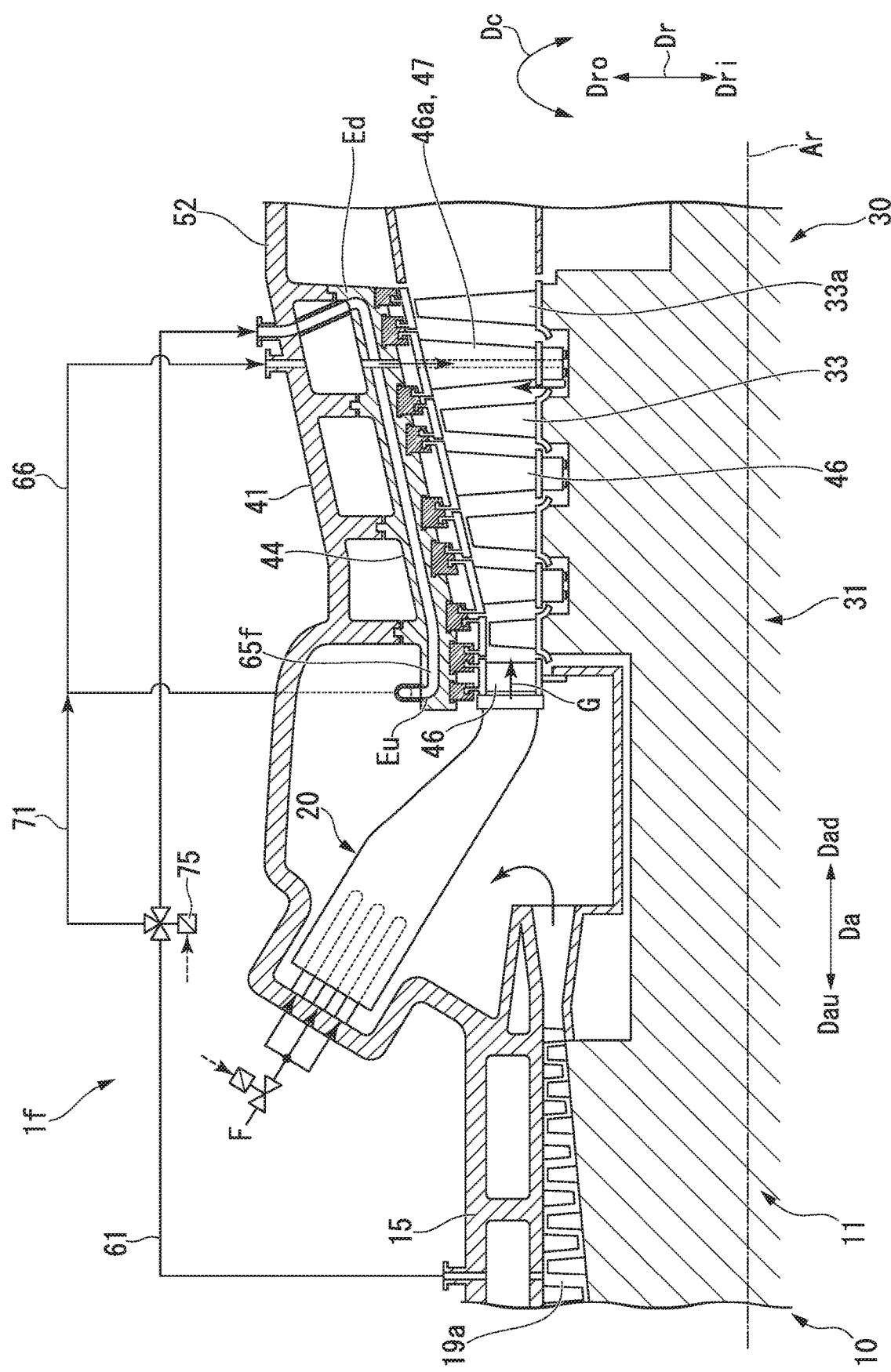
FIG. 14 is a main cross-sectional view of a gas turbine in a seventh embodiment according to the present invention.

As shown in FIG. 14, in a gas turbine 1f of the present embodiment, similarly to the first embodiment, a position of the axially upstream end Eu of a vane ring air flow path 65f in the axial direction Da is the position at which the first stage vane row 46 is provided in the axial direction Da. Meanwhile, a position of the axially downstream end Ed of the vane ring air flow path 65f in the axial direction Da is the position at which the fourth stage blade row 33a is provided in the axial direction Da. That is, in the gas turbine if of the present embodiment, the position of the axially downstream end Ed of the vane ring air flow path 65f in the axial direction Da is shifted to the axially downstream side Dad from the position of the axially downstream end Ed of each of the vane ring air flow paths 65 and 65b of the first and third embodiments in the axial direction Da. Accordingly, the length of the vane ring air flow path 65f of the present embodiment in the axial direction Da is longer than the length of each of the vane ring air flow paths 65 and 65b of the first and third embodiments in the axial direction Da. In addition, the gas turbine if of the present embodiment is different from the gas turbine 1 of the first embodiment in the above-described matters, and other matters of the gas turbine If of the present embodiment are the same as those of the gas turbine 1 of the first embodiment.

As described above, in the present embodiment, the position of the axially downstream end Ed of the vane ring air flow path 65*f* in the axial direction Da is shifted to the axially downstream side Dad from the position of the axially downstream end Ed of each of the vane ring air flow paths 65 and 65*b* of the first and third embodiments in the axial direction Da, it is possible to cool the axially downstream side Dad of the vane ring 44 more than in the first embodiment and the third embodiment.

Meanwhile, as described above, in the present embodiment, the position of the axially downstream end Ed of the vane ring air flow path 65*f* in the axial direction Da is the position at which the fourth stage blade row 33*a* is provided in the axial direction Da. Accordingly, the plurality of vanes 47 configuring the fourth stage vane row 46*a* which are the low-pressure component (second component) are disposed in a region in which the vane ring air flow path 65*f* exists in the axial direction Da. Accordingly, unlike the above-described embodiments, even when the low-pressure component is not disposed on the axially downstream side Dad from the vane ring air flow path, the low-pressure component may be disposed at any position as long as the low-pressure component is disposed under an environment lower than the pressure of the compressed air at the outlet of the intermediate compression stage 19*a*.

In addition, the present embodiment is a modification example of the first embodiment. However, similarly to the present embodiment, the position of the axially downstream end Ed of the vane ring air flow path may be shifted to the axially downstream side Dad in the second embodiment and the fourth to sixth embodiments.

Eighth Embodiment

Figure 15:
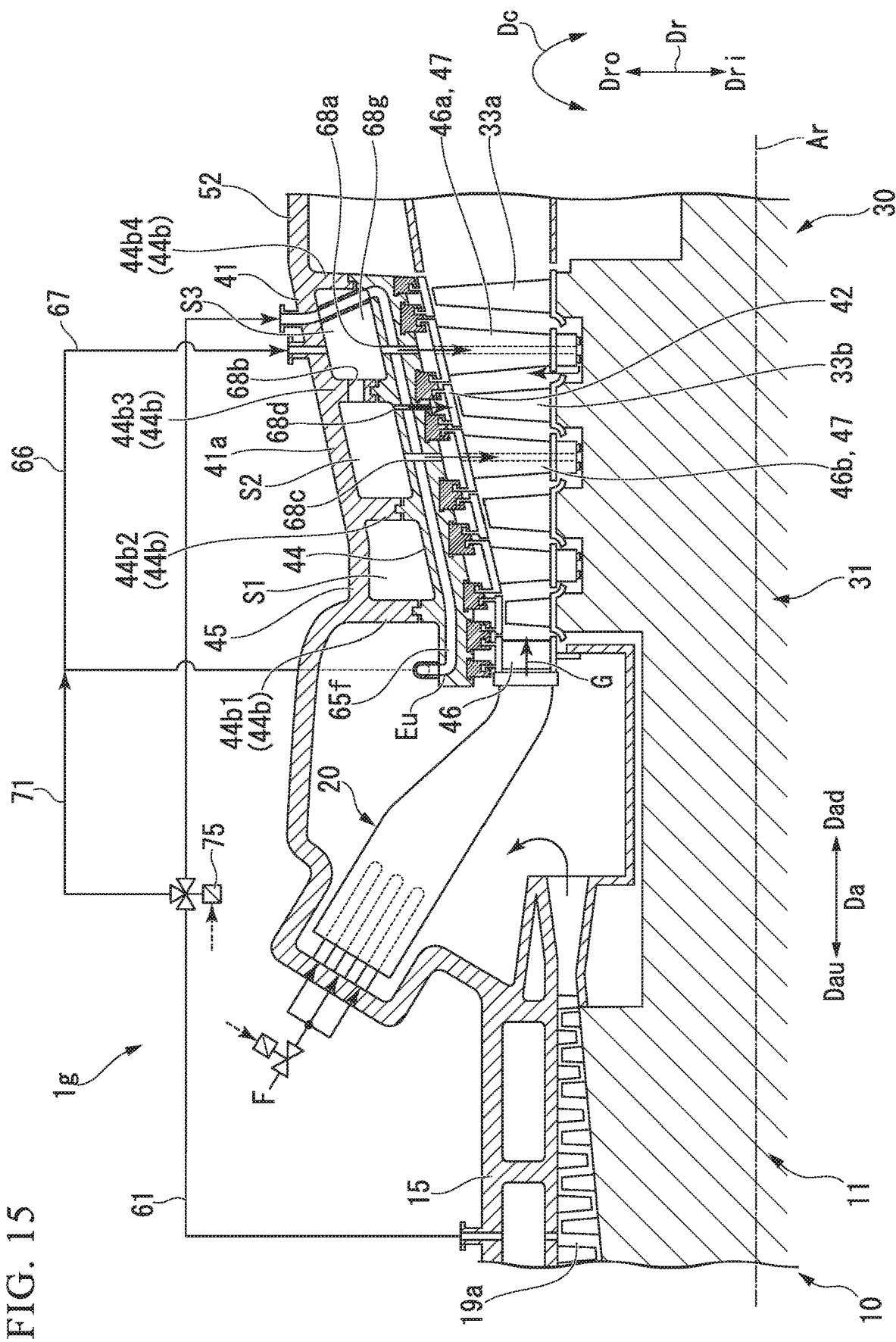
FIG. 15 is a main cross-sectional view of a gas turbine in an eighth embodiment according to the present invention.

An eighth embodiment of the gas turbine according to the present invention will be described with reference to FIG. 15.

A gas turbine 1*g* of the present embodiment is a modification example of the gas turbine 1*f* of the seventh embodiment. In the seventh embodiment, the low-pressure component (second component) is only the vane 47 configuring the fourth stage vane row 46*a* disposed on the axially downstream side Dad from the vane ring air flow path 65*f* of the vane ring 44.

In the present embodiment, the low-pressure component (second component) is the vane 47 configuring the fourth stage vane row 46*a*, the vane 47 configuring the third stage vane row 46*b*, and the ring segment 42 disposed on the radially outer side Dro of the third stage blade row 33*b*. The above-described components configuring the low-pressure component are disposed under a pressure environment lower than the pressure of the compressed air at the outlet of the intermediate compression stage 19*a*.

The casing main body 45 which is the configuration component of the turbine casing 41 of the present embodiment includes a tubular body portion 41*a* having the axis Ar as the center and a plurality of partition portions 44*b* which extend from an inner peripheral surface of the body portion 41*a* to the axially inner side Dri. The plurality of partition portions 44*b* are arranged in the axial direction Da at intervals in the axial direction Da. The vane ring 44 is attached to the end of the radially inner side Dri of each partition portion 44*b*. A space between the body portion 41*a* of the casing main body 45 and the vane ring 44 in the radial direction Dr is divided into a plurality of spaces by the plurality of partition portions 44*b*. In the present embodiment, for example, four partition portions 44*b* exist between the body portion 41*a*and the vane ring 44 in the radial direction Dr. In the present embodiment, three spaces are formed between the body portion 41*a* and the vane ring 44 in the radial direction by the four partition portions 44*b*. In the four partition portions 44*b*, a first space S1 is formed between a first partition portion 44*b*1 on the most axially upstream side Dau and a second partition portion 44*b*2 adjacent to the axially downstream side Dad with respect to the first partition portion 44*b*1. In addition, a second space S2 is formed between the second partition portion 44*b*2 and a third partition portion 44*b*3 adjacent to the axially downstream side Dad with respect to the second partition portion 44*b*2. Moreover, a third space S3 is formed between the third partition portion 44*b*3 and a fourth partition portion 44*b*4 adjacent to the most axially downstream side Dad with respect to the third partition portion 44*b*3.

The reuse pipe 67 configuring a portion of the component introduction line 66 communicates with the third space S3. The fourth stage vane row 46*a* exists at the position on the radially inner side Dri of the third space S3. A first vane ring through-hole 68*a* is formed in the vane ring 44, and the first vane ring through-hole 68*a* penetrates the inner peripheral surface of the vane ring 44 from a surface of an outer peripheral surface of the vane ring 44 defining the third space S3 and faces the fourth stage vane row 46*a*. A partition portion through-hole 68*b* penetrating the third partition portion 44*b*3 in the axial direction Da is formed in the third partition portion 44*b*3. The third stage vane row 46*b* and the ring segment 42 which is disposed on the axially downstream side Dad of the third stage vane row 46*b* exist at the position on the radially inner side Dri of the second space S2. A second vane ring through-hole 68*c* is formed in the vane ring 44, and the second vane ring through-hole 68*c* penetrates the inner peripheral surface of the vane ring 44 from the surface of the outer peripheral surface of the vane ring 44 defining the second space S2 and faces the third stage vane row 46*b*. In addition, a third vane ring through-hole 68*d* is formed in the vane ring 44, and the third vane ring through-hole 68*d* penetrates the inner peripheral surface of the vane ring 44 from the surface of the outer peripheral surface of the vane ring 44 defining the second space S2 and faces the ring segment 42. The third space S3, the first vane ring through-hole 68*a*, the second space S2, the second vane ring through-hole 68*c,* and the third vane ring through-hole 68*d* configure a casing air flow path 68*g* which is a portion of the flow path of the component introduction line 66.

The extraction air from the reuse pipe 67 configuring a portion of the component introduction line 66 flows into the third space S3. A portion of the extraction air which has flowed into the third space S3 is introduced to the vane 47 configuring the fourth stage vane rows 46*a* via the first vane ring through-hole 68*a* so as to cool the vane 47. The remainder of the extraction air which has flowed into the third space S3 flows into the second space S2 via the partition portion through-hole 68*b* of the third partition portion 44*b*3. A portion of the extraction air which has flowed into the second space S2 is introduced to the vane 47 configuring the third stage vane rows 46*b* via the second vane ring through-hole 68*c* so as to cool the vane 47. The remainder of the extraction air which has flowed into the second space S2 is introduced into the ring segment 42 via the third vane ring through-hole 68*d* so as to cool the ring segment 42.

As described above, the low-pressure component cooled by the extraction air flowing through the component introduction line 66 may be not only one kind of component but also a plurality of kinds of components.

In addition, in the present embodiment, the vane 47 configuring the fourth stage vane row 46*a*, the vane 47 configuring the third stage vane row 46*b*, and the ring segment 42 disposed on the radially outer side Dro of the third stage blade row 33b are the low-pressure components. However, one kind of component or a plurality of kinds of components may be deleted from the components. Conversely, for example, the vane 47 configuring the second stage vane row 46 or the ring segment 42 disposed on the radially outer side Dro of the second stage blade row 33 may be the low-pressure component. In this case, it is necessary that the components are disposed under a pressure environment lower than the pressure of the compressed air at the outlet of the intermediate compression stage 19a.

Moreover, the present embodiment is a modification example of the seventh embodiment. However, similarly to the present embodiment, the plurality of kinds of components may be the low-pressure component in the first to sixth embodiments.

INDUSTRIAL APPLICABILITY

According to an aspect of the present invention, it is possible to effectively use the compressed air having a high temperature and a high pressure while decreasing the equipment cost.

Reference Signs List 1, 1a, 1b, 1c, 1d, 1e, 1f, 1g: gas turbine
2: gas turbine rotor
3: gas turbine casing
9: generator
10: compressor
11: compressor rotor
12: rotor shaft
13: blade row
14: blade
15: compressor casing
16: vane row
17: vane
19: compression stage
19a: intermediate compression stage
19b: high-pressure compression stage
20: combustor
25: fuel line
26: fuel regulating valve
30: turbine
31: turbine rotor
32: rotor shaft
32c: disk cavity
33: blade row
33a: fourth stage blade row
34: blade (low-pressure component)
34p: blade air flow path (second air flow path)
35: blade body
36: platform
37: blade root
41: turbine casing
41a: body portion
41p: combustion gas flow path
42: ring segment
43: isolation ring
44: vane ring (first component)
44b: partition portion
45: casing main body
46: vane row
46a: fourth step vane row
46b: third step vane row
47: vane (low-pressure component)
47p: vane air flow path (second air flow path)
48: vane body
49o: outer shroud
49i: inner shroud
51: intermediate casing
52: exhaust chamber
61, 61a: extraction line
65, 65b, 65f: vane ring air flow path (first air flow path, first region)
66, 66a, 66e: component introduction line
67: reuse pipe
68, 68g: casing air flow path
69: rotor air flow path
71: bypass line
75: switcher (three-way valve)
80: heater
81: electric heater
82: heater drive circuit
84: second extraction line (high-temperature air line)
85: switcher
100, 100c, 100d: controller
102, 102c, 102d: component temperature control unit (cooling controller and/or heating controller)

The invention claimed is:

1. A gas turbine comprising:
a compressor which includes a plurality of compression stages and is configured to sequentially compress air at each of the compression stages;
a combustor which is configured to combust a fuel in air compressed by the compressor to generate a combustion gas;
a turbine which includes a turbine rotor which is rotated about an axis by the combustion gas, a tubular turbine casing which covers the turbine rotor, and a plurality of vane rows which are fixed to an inner peripheral side of the turbine casing;
an extraction line through which the compressed air from an intermediate compression stage among the plurality of compression stages is extracted as an extraction air and the extraction air is introduced to a first component configuring a portion of the turbine casing; and
a component introduction line through which the extraction air which has passed through the first component is introduced to a second component, which is different from the first component, among components configuring the turbine,
wherein a first air flow path which extends in an axial direction in which the axis extends and through which the extraction air from the extraction line flows is formed in the first component,
wherein the second component is a low-pressure component which is disposed under a pressure environment lower than a pressure of the compressed air at an outlet of the intermediate compression stage,
wherein a second air flow path through which the extraction air from the component introduction line flows is formed in the low-pressure component,
wherein the low-pressure component is disposed on an axially downstream side, which is a side to which the combustion gas flows, from the first air flow path in the first component,
wherein the extraction line is connected to an axially downstream end of the first air flow path, and
wherein the component introduction line is connected to an axially upstream end of the first air flow path.

2. The gas turbine according to claim 1,
wherein the low-pressure component is disposed in a region, in which the first air flow path in the first component exists, in the axial direction.

3. The gas turbine according to claim 1,
wherein the second air flow path of the low-pressure component is formed such that the extraction air from the component introduction line is able to flow to a combustion gas flow path through which the combustion gas flows.

4. The gas turbine according to claim 1,
wherein each of the plurality of vane rows includes a plurality of vanes which are arranged in a circumferential direction with respect to the axis, and
wherein the low-pressure component is a plurality of vanes configuring at least one vane row which is disposed under the pressure environment lower than the pressure of the compressed air at the outlet of the intermediate compression stage, among the plurality of vane rows.

5. The gas turbine according to claim 1,
wherein the vane includes a vane body which extends in a radial direction with respect to the axis to form a vane profile, an outer shroud which is provided radially outside the vane body, and an inner shroud which is provided radially inside the vane body, and
wherein the second air flow path is formed in the plurality of vanes configuring the low-pressure component, and the extraction air from the component introduction line flows from the outer shroud into the second air flow path and flows out through the second air flow path from the inner shroud via the vane body.

6. The gas turbine according to claim 1,
wherein the turbine rotor includes a rotor shaft which extends in the axial direction about the axis and a plurality of blade rows which are arranged at intervals in the axial direction,
wherein the low-pressure component is a plurality of blades configuring at least one blade row which is disposed under the pressure environment lower than the pressure of the compressed air at the outlet of the intermediate compression stage, among the plurality of blade rows,
wherein a third air flow path which extends from an axial end of the rotor shaft to the plurality of blades configuring the low-pressure component is formed in the rotor shaft, and
wherein the component introduction line includes the third air flow path of the rotor shaft.

7. The gas turbine according to claim 1,
wherein the turbine rotor includes a rotor shaft which extends in the axial direction about the axis and a plurality of blade rows which are arranged at intervals in the axial direction,
wherein the turbine casing includes a plurality of ring segments which face the blade rows in the radial direction with respect to the axis, a vane ring which supports the plurality of ring segments and the plurality of vane rows from a radially outer side, and a casing main body which supports the vane ring from the radially outer side, and
wherein the first component is the vane ring.

8. The gas turbine according to claim 1,
wherein the vane ring is an integrally formed product in the axial direction in a region in which the first air flow path is formed.

9. The gas turbine according to claim 1, further comprising:
a heating device which is configured to heat the first component; and
a heating controller which is configured to cause, in a start process of the turbine, the heating device to heat the first component until an output of the gas turbine or an output correlation value which is a parameter having correlation with the output becomes a first value at the latest from when the turbine rotor starts an increase in a speed and stops heating of the first component of the heating device if the output correlation value exceeds the first value.

10. The gas turbine according to claim 1,
wherein the heating device is capable of heating the first component independently of start and stop operations of the compressor, and
wherein the heating controller causes, in the start process of the turbine, the heating device to heat the first component until the output correlation value becomes the first value from a predetermined time before the turbine rotor starts the increase in the speed.

11. The gas turbine according to claim 1,
wherein the heating device is a heater which is provided in the extraction line or the first component and is configured to generate heat.

12. The gas turbine according to claim 1,
wherein the heating device includes a high-temperature air line which is connected to the extraction line and through which air having a temperature higher than that of the extraction air extracted from the intermediate compression stage flows, and a switcher,
wherein the switcher is configured to perform switching between a heating state where air from the high-temperature air line flows into the first air flow path via the extraction line and a steady state where the extraction air which has flowed into the extraction line flows into the first air flow path and air from the high-temperature air line does not flow into the extraction line, and
wherein the heating controller is configured to control an operation of the switcher.

13. A gas turbine comprising:
a compressor which includes a plurality of compression stages and is configured to sequentially compress air at each of the compression stages;
a combustor which is configured to combust a fuel in air compressed by the compressor to generate a combustion gas;
a turbine which includes a turbine rotor which is rotated about an axis by the combustion gas, a tubular turbine casing which covers the turbine rotor, and a plurality of vane rows which are fixed to an inner peripheral side of the turbine casing;
an extraction line through which the compressed air from an intermediate compression stage among the plurality of compression stages is extracted as an extraction air and the extraction air is introduced to a first component configuring a portion of the turbine casing; and
a component introduction line through which the extraction air which has passed through the first component is introduced to a second component, which is different from the first component, among components configuring the turbine,
wherein a first air flow path which extends in an axial direction in which the axis extends and through which the extraction air from the extraction line flows is formed in the first component, wherein the second component is a low-pressure component which is disposed under a pressure environment lower than a pressure of the compressed air at an outlet of the intermediate compression stage, wherein a second air flow path through which the extraction air from the component introduction line flows is formed in the low-pressure component, and wherein the gas turbine includes:

a bypass line which is connected to the extraction line and the component introduction line and bypasses the first air flow path, and through which the extraction air which has flowed into the extraction line is introduced to the component introduction line, and a switcher which is configured to perform switching between a steady state where the extraction air which has flowed into the extraction line flows into the first air flow path and a bypass state where the extraction air which has flowed into the extraction line flows into the low-pressure component via the bypass line and the component introduction line.

14. The gas turbine according to claim 13, further comprising:

a cooling controller which is configured to output a command to the switcher such that the state becomes the bypass state until an output of the gas turbine or an output correlation value which is a parameter having correlation with the output becomes a first value after the turbine starts, and output a command to the switcher such that the state becomes the steady state if the output correlation value exceeds the first value.

15. A gas turbine comprising:

a compressor which includes a plurality of compression stages and is configured to sequentially compress air at each of the compression stages;

a combustor which is configured to combust a fuel in air compressed by the compressor to generate a combustion gas;

a turbine which includes a turbine rotor which is rotated about an axis by the combustion gas, a tubular turbine casing which covers the turbine rotor, and a plurality of vane rows which are fixed to an inner peripheral side of the turbine casing;

an extraction line through which the compressed air from an intermediate compression stage among the plurality of compression stages is extracted as an extraction air and the extraction air is introduced to a first component configuring a portion of the turbine casing; and a component introduction line through which the extraction air which has passed through the first component is introduced to a second component, which is different from the first component, among components configuring the turbine, wherein a first air flow path which extends in an axial direction in which the axis extends and through which the extraction air from the extraction line flows is formed in the first component, wherein the second component is a low-pressure component which is disposed under a pressure environment lower than a pressure of the compressed air at an outlet of the intermediate compression stage, and wherein a second air flow path through which the extraction air from the component introduction line flows is formed in the low-pressure component, wherein the extraction air flowing through the first component flows into a reuse pipe, a first end of the reuse pipe is connected to the first component, and a second end of the reuse pipe is connected to the turbine casing from the outside of the turbine casing, wherein the turbine rotor includes a rotor shaft which extends in the axial direction about the axis and a plurality of blade rows which are arranged at intervals in the axial direction, wherein the low-pressure component is a plurality of blades configuring at least one blade row which is disposed under the pressure environment lower than the pressure of the compressed air at the outlet of the intermediate compression stage, among the plurality of blade rows, wherein a third air flow path which extends from an axial end of the rotor shaft to the plurality of blades configuring the low-pressure component is formed in the rotor shaft, and wherein the component introduction line includes the third air flow path of the rotor shaft.

* * * * *